(12) United States Patent
Teo et al.

(10) Patent No.: US 9,397,501 B2
(45) Date of Patent: Jul. 19, 2016

(54) MAXIMUM POWER POINT TRACKING FOR PHOTOVOLTAIC POWER GENERATION SYSTEM

(71) Applicant: Mitsubishi Electric Research Laboratories, Inc., Cambridge, MA (US)

(72) Inventors: Koon Hoo Teo, Lexington, MA (US); Yi Deng, Atlanta, GA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 354 days.

(21) Appl. No.: 14/020,940

(22) Filed: Sep. 9, 2013

(65) Prior Publication Data

US 2015/0069840 A1    Mar. 12, 2015

(51) Int. Cl.
G06F 3/06 (2006.01)
H02J 3/38 (2006.01)
G05F 1/67 (2006.01)

(52) U.S. Cl.
CPC . H02J 3/385 (2013.01); G05F 1/67 (2013.01); Y02E 10/58 (2013.01); Y10T 307/549 (2015.04)

(58) Field of Classification Search
CPC ......... H02J 3/385; Y10T 307/696; G05F 1/67
USPC ................................................... 307/80, 151
See application file for complete search history.

(56) References Cited

U.S. PATENT DOCUMENTS

| 7,994,768 B2 | 8/2011 | Park |
| 2005/0254191 A1 | 11/2005 | Bashaw |
| 2009/0284240 A1 | 11/2009 | Zhang |
| 2010/0052425 A1 | 3/2010 | Moore |
| 2010/0123428 A1 | 5/2010 | Wu |
| 2011/0001360 A1 | 1/2011 | Rua' |
| 2011/0134668 A1 | 6/2011 | Cho |
| 2012/0085384 A1 | 4/2012 | Beitel |
| 2012/0255591 A1* | 10/2012 | Arditi ............... H01L 31/02021 136/244 |

OTHER PUBLICATIONS

Femia et al. "A Techniquie for Improving P&O MPPT Performances of Double-Stage Grid-Connected Photovoltaic Systems." IEEE Transactions of Industrial Electronics, vol. 56, No. p. 4473-4482. Nov. 11, 2009.

Liu et al. "A Variable Step Size INC MPPT Method for PV Systems." IEEE Transactions on Industrial Electronocs, vol. 55, No. 7, p. 2622-2628. Jul. 2008.

Noguchi et al. "Short-Current Pulse-Based Maximum-Power-Point Tracking Method for Multiple Photovoltaic-and Converter." IEEE Transactions on Industrial Electronics, vol. 49, No. 1. p. 217-223. Feb. 2002.

Masoum et al. "Theoretical and Experimental Analysis of Photovoltaic Systems with Voltage- and Current-Based Maximum Power-Point Tracking." IEEE Transactions on Energy Conversion, vol. 17, No. 4. p. 514-522. Dec. 2002.

* cited by examiner

*Primary Examiner* — Carlos Amaya

(74) *Attorney, Agent, or Firm* — Gene Vinokur; James McAleenan; Hironori Tsukamoto

(57) ABSTRACT

A method controls power generated by a photovoltaic array. The method estimates a voltage corresponding to a global maximum power point (MPP) of the power generated by the photovoltaic array to produce an estimated voltage; and tracks an output of the power based on the estimated voltage to determine the global MPP.

10 Claims, 20 Drawing Sheets

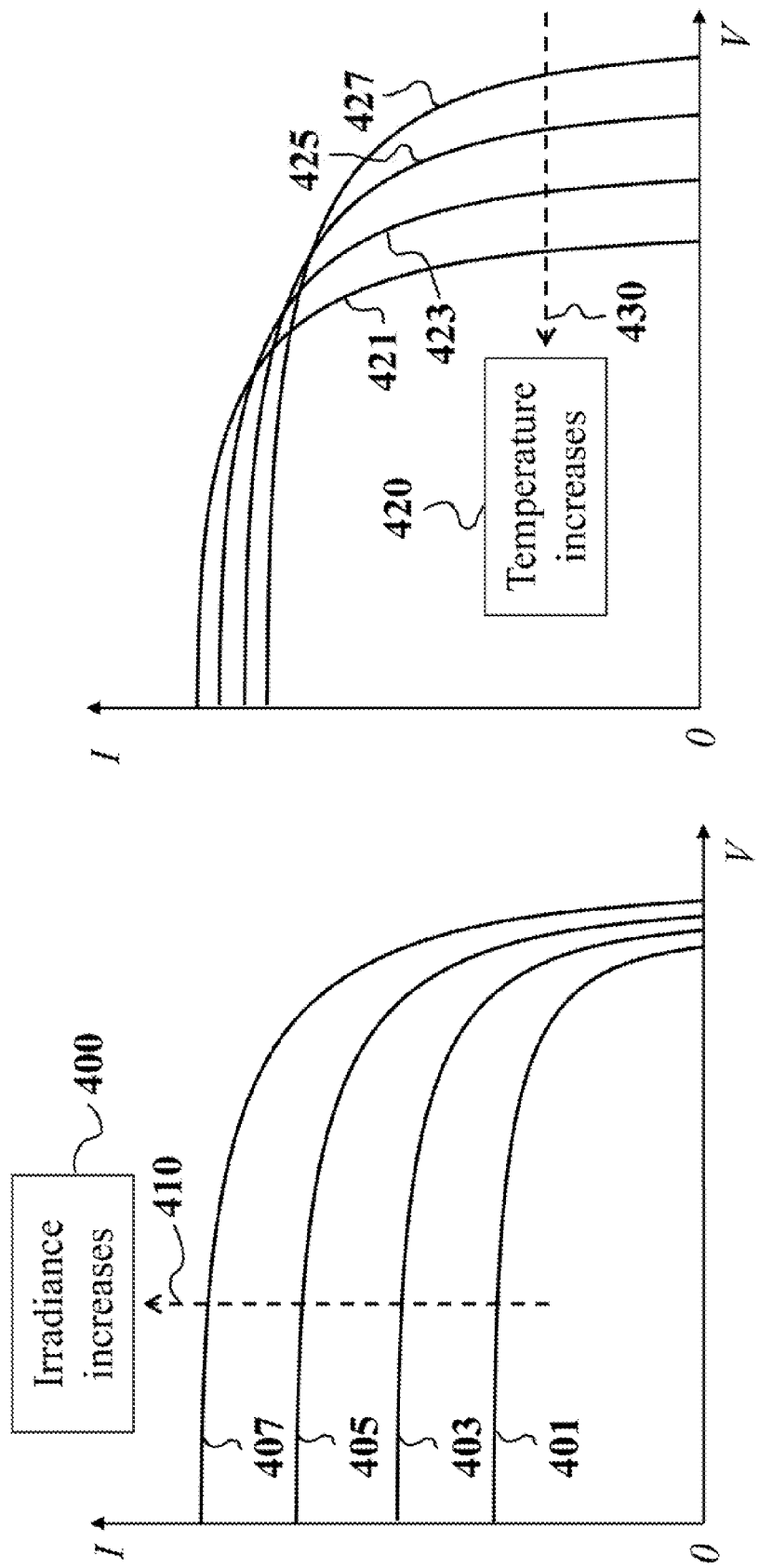

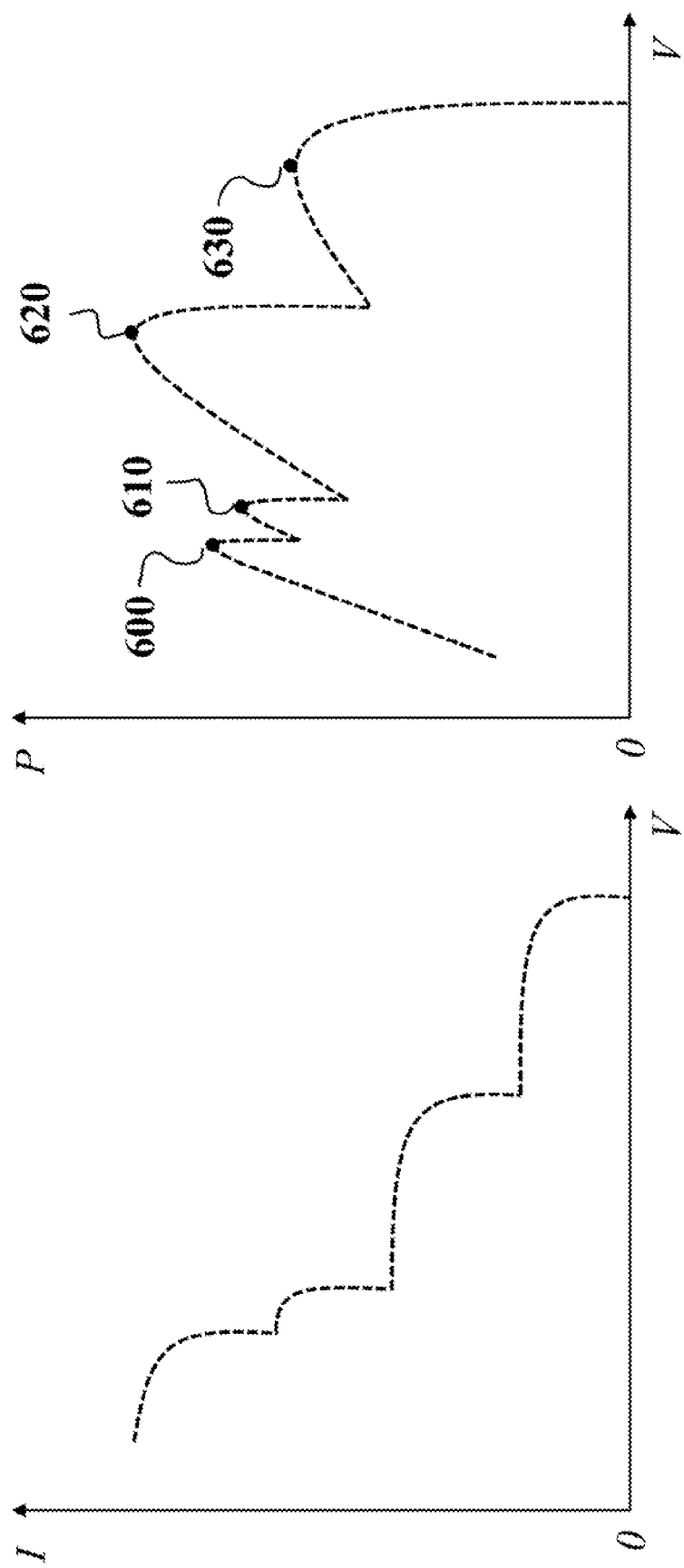

$$v_j(k+1) = \underbrace{w \cdot v_j(k)}_{910} + \underbrace{c_1 \phi_1 \cdot (x_{i,pbest}(k) - x_i(k))}_{920} + \underbrace{c_2 \phi_2 \cdot (x_{gbest}(k) - x_i(k))}_{930}$$

MAXIMUM POWER POINT TRACKING FOR PHOTOVOLTAIC POWER GENERATION SYSTEM

FIELD OF THE INVENTION

This invention relates generally to electrical power conversion systems, and more particularly to control methods for photovoltaic power conversion system.

BACKGROUND OF THE INVENTION

Maximum Power Point Tracking (MPPT) is an electronic system that enables photovoltaic (PV) modules to deliver the maximum available power. MPPT is frequently used by PV power conversion system in conjunction with mechanical tracking that physically moves the modules. For example, a perturb and observe (P&O) MPPT method is described by N. Femia, et al., "A Technique for Improving. P&O MPPT Performances of Double-Stage Grid-Connected Photovoltaic Systems," IEEE Trans. Ind. Electron., vol. 56, no. 11, pp. 4473-4482. November 2009. The incremental conductance (INC) MPPT is described by F. Liu, et al., "A Variable Step Size INC MPPT Method for PV Systems," IEEE Trans. Ind. Electron., vol. 55, no. 7, pp. 2622-2628, July 2008. A fractional open-circuit voltage based MPPT is described by M. Masoum, et. al., "Theoretical and experimental analyses of photovoltaic systems with voltage and current-based maximum power-point tracking," IEEE Trans. Power Convers., vol. 17, no. 4, pp. 514-522, Dee, 2002. A fractional short-circuit current based MPPT is described by T. Noguchi et al., "Short-current pulse-based maximum-power-point tracking method for multiple photovoltaic and converter module system," IEEE Trans. Ind. Electron., vol. 49, no. 1, pp. 217-223, February 2002.

However, those MPPT methods are not reliable for applications with multiple local maximum power points. When the photovoltaic modules in the photovoltaic array perform differently, multiple local maximum power points of the power outputted by the photovoltaic array may occur. Considerable power loss can be incurred when a local maximum power point is tracked instead of the global maxi mum power point.

Accordingly, there is a need for MPPT method, which is suitable for real-time global maximum power point tracking under multiple local maximum power points conditions, for photovoltaic arrays.

SUMMARY OF THE INVENTION

Various embodiments of the invention are based on a realization that a voltage of a photovoltaic array at the maximum power point (MPP) can be estimated. The estimated MPP is not necessarily a global MPP, but is sufficiently close to the global MPP, such that an output of a maximum power point tracking (MPPT) performed near the estimated MPP is the global MPP, and not a local MPP. Thus, the estimation of the MPP ensures MPPT for the photovoltaic array with multiple local maximum power points conditions.

Thus, a MPPT method according to some embodiments of the invention estimates a voltage of the photovoltaic array at the MPP, and tracks the maximum power point based on the estimated voltage. The MPPT method of those embodiments is suitable for multiple local maximum power points conditions.

Accordingly, one embodiment of the invention discloses a method for controlling power generated by a photovoltaic array. The method includes estimating a voltage corresponding to a global maximum power point (MPP) of the power generated by the photovoltaic array to produce an estimated voltage; and tracking an output of the power based on the estimated voltage to determine the global MPP. The steps of the method are performed by a processor.

Another embodiment discloses a photovoltaic power conversion system. The system includes a photovoltaic array generating a power with multiple local maximum power points; a power converter for converting a voltage supplied by the photovoltaic array into a converted voltage; a maximum power point (MPP) voltage estimator for producing an estimated voltage corresponding to a global MPP of the power generated by the photovoltaic array; and a controller for tracking an output of the power based on the estimated voltage to determine the global MPP and for generating a control signal to control an operation of the power converter in accordance with the global MPP.

BRIEF DESCRIPTION OF THE DRAWINGS

FIG. 9A and FIG. 9B are graphs showing the influence of the solar irradiance and the panel temperature on the output characteristics of the photovoltaic module;

FIGS. 11A and 11B are graphs of examples of the output current-voltage (I-V) and power-voltage (P-V) characteristics of the photovoltaic array according to some embodiments of the invention;

DETAILED DESCRIPTION OF THE PREFERRED EMBODIMENTS OF THE INVENTION

Various embodiments of the invention are based on a realization that a voltage of a photovoltaic array at a maximum power point (MPP) can be estimated. The estimated MPP is not necessarily a global MPP, but is sufficiently close to the global MPP, such that an output of a maximum power point tracking (MPPT) performed near the estimated MPP is the global MPP, and not a local MPP. Thus, the estimation of the MPP allows using MPPT under multiple local maximum power points conditions.

Thus, a MPPT method according to some embodiments of the invention estimates a voltage of the photovoltaic array at the MPP and tracks the maximum power point based on the estimated voltage. The MITT method of those embodiments is suitable for multiple local maximum power points conditions.

Figure 1:
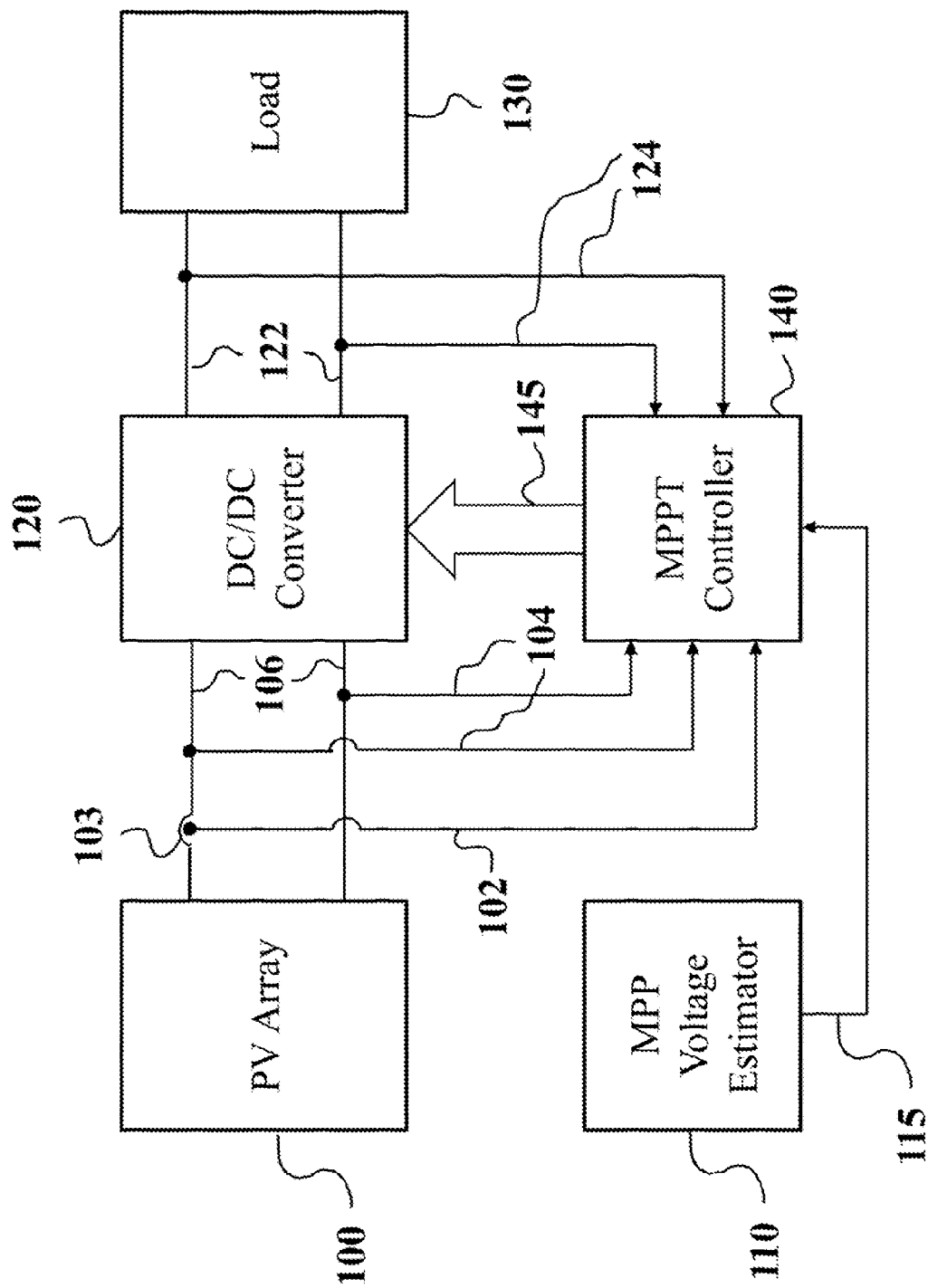
FIG. 1 is a block diagram of a photovoltaic power conversion system according to some embodiments of the invention.

FIG. 1 shows an example of a photovoltaic power conversion system with MPPT control according to some embodiments of the invention. Voltage of the photovoltaic array 100 is supplied on input lines 106 to a direct current/direct current (DC/DC) converter 120. The DC/DC converter provides DC voltage through output lines 122 to the load 130. The estimated voltage 115 of the photovoltaic array at a maximum power point (MPP), also called the estimated MPP voltage 115 of the photovoltaic array, is generated by a MPP voltage estimator 110 and provided to a MPPT controller 140. The MPPT controller tracks an output of the power based on the estimated voltage to determine the global MPP and generates the control signal 145 to control an operation of the DC/DC converter 120 in accordance with the global MPP. In some embodiments, the MPPT controller determines the control signal based on the estimated MPP voltage 115, the measured voltage signal of the photovoltaic array on line 104, the measured current signal of the photovoltaic array on line 102 through a current sensor 103, and the measured voltage signal of the load 130 on line 124.

Figure 2:
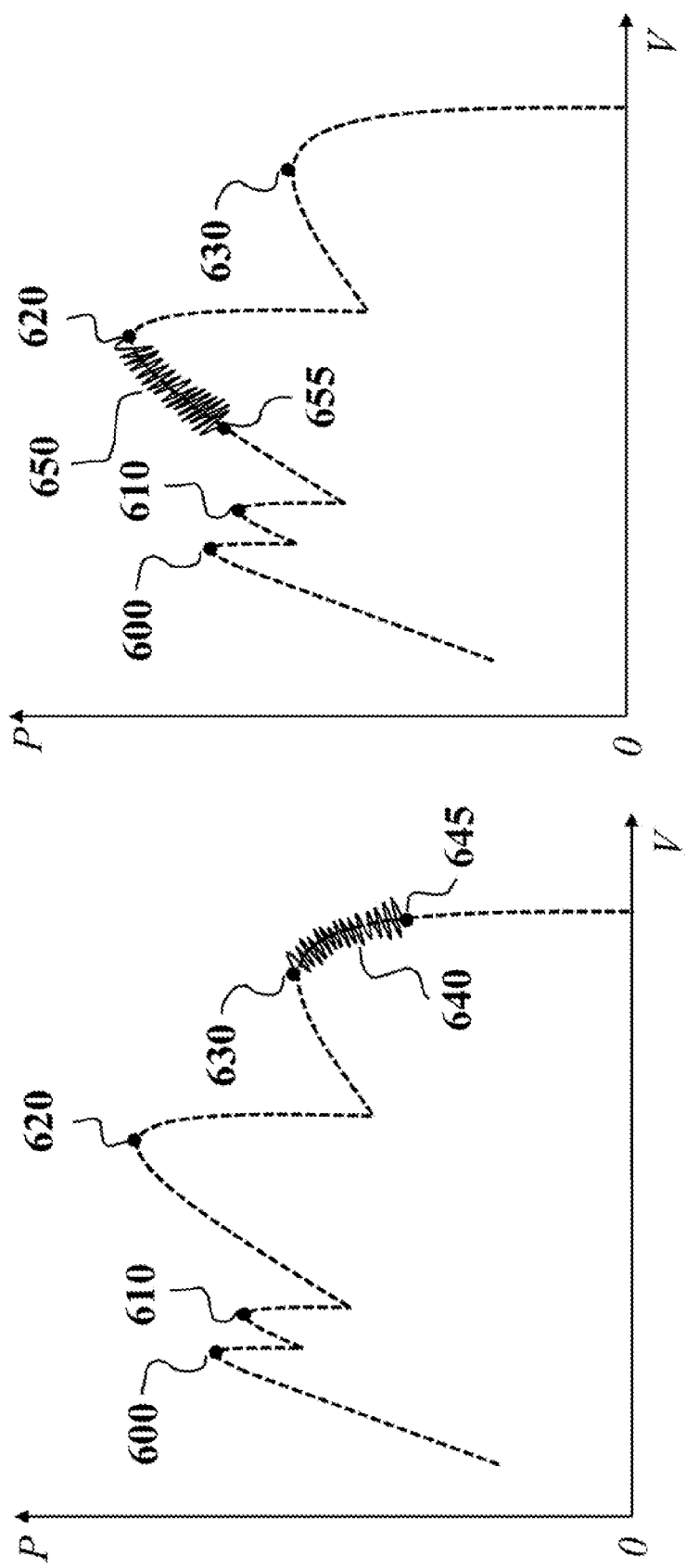
FIG. 2A and FIG. 2B are graphs of examples of the output power for the photovoltaic array with multiple local maximum power points.

FIG. 2A and FIG. 2B show an example of the output power for the photovoltaic array 100 as a function of voltage with multiple local maximum power points. For conventional MPPT methods, the global maximum power point 620 is not assured to be tracked when there are multiple local maximum power points 600, 610, 620, and 630, in other words, the conventional MPPT methods may converge to point 600, 610, or 630, which reduces the efficiency of the photovoltaic array 100. FIG. 2A shows an example of the tracking trajectory 640, in which a local maximum power point 630 is tracked instead of the global MPP 620 and considerable power loss is incurred.

FIG. 2B shows an example of the tracking trajectory 650 for the MPPT controller 140 according to some embodiments of the invention. In some embodiments, the MPP voltage estimator 110 generates an estimated MPP voltage 115 for the photovoltaic array 100, and the MPPT controller 140 tracks the global maximum power point 620 of the photovoltaic array based on the estimated MPP voltage 115. FIG. 2B shows that the global maximum power point 620 of the photovoltaic array is tracked based on the estimated MPP voltage 115, i.e., the voltage of the photovoltaic array at point 655, even when the estimated MPP voltage 115 is not the actual voltage of the photovoltaic array at the global maximum power point 620. Because of the reference of the estimated MPP voltage 115, the local maximum power points 600, 610, and 630 are avoided by the MPPT controller 140.

Figure 3:
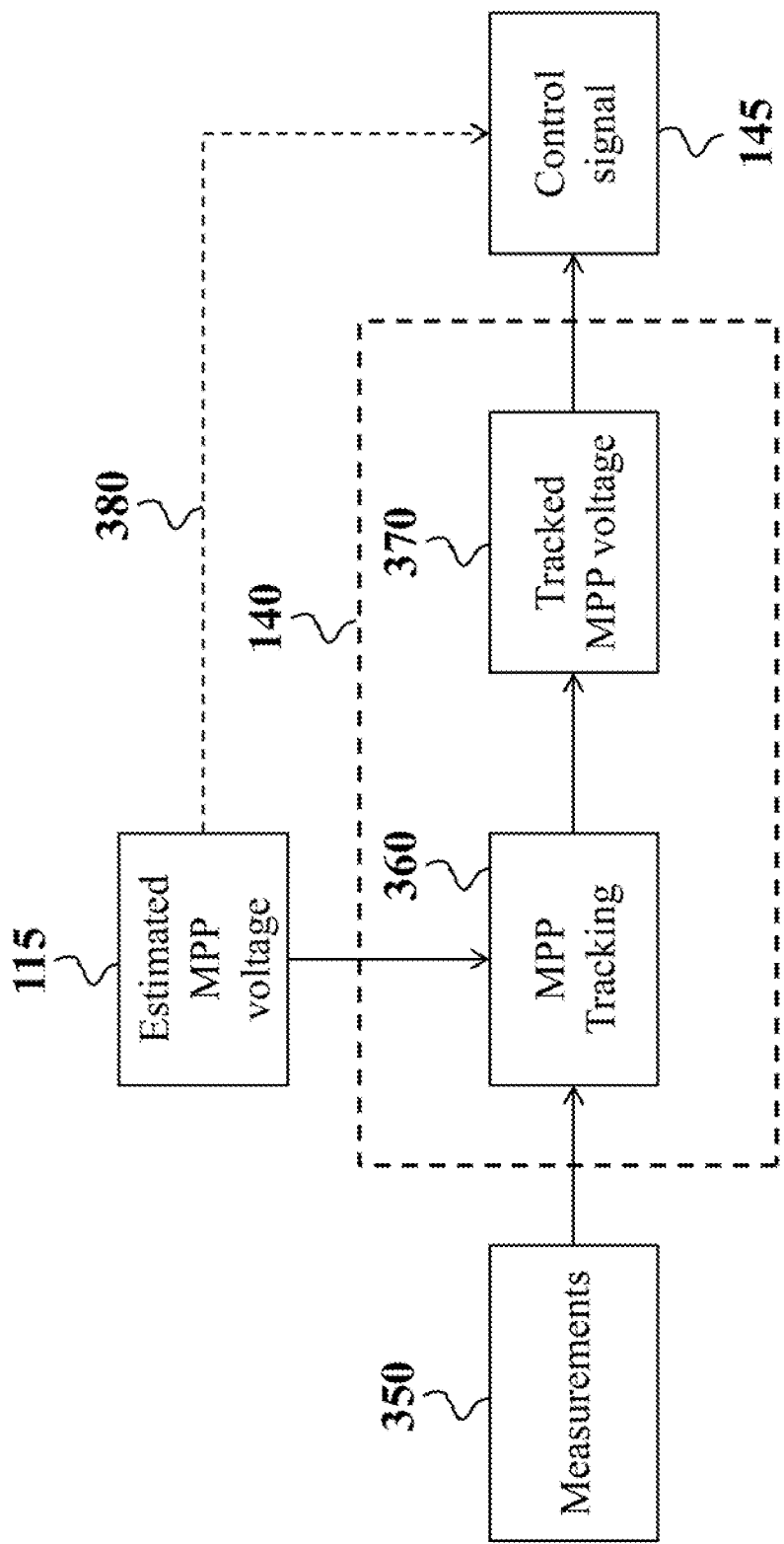
FIG. 3 is a block diagram of a MPPT method according to some embodiments of the invention.

FIG. 3 shows a block diagram of a MPPT method according to some embodiments of the invention. The measurements 350 represent the measured voltage signal of the photovoltaic array on line 104, the measured current signal of the photovoltaic array on line 102 through a current sensor 103, and the measured voltage signal of the load 130 powered by the photovoltaic array. The MPP tracking 360 can use various MPPT tracking schemes. However, the MPP tracking 360 in some embodiments of the invention receives an estimated MPP voltage 115, generated by the MPP voltage estimator 110, as a reference. The MPP tracking 360 is implemented based on the estimated MPP voltage 115 to generate a tracked MPP voltage 370 for each tracking step. The control signal 145 is produced according to the tracked MPP voltage 370. The dashed line 380 means that in some embodiments of the invention, the control signal 145 is produced directly based on the estimated MPP voltage 115 without the MPP tracking 360.

Figure 4:
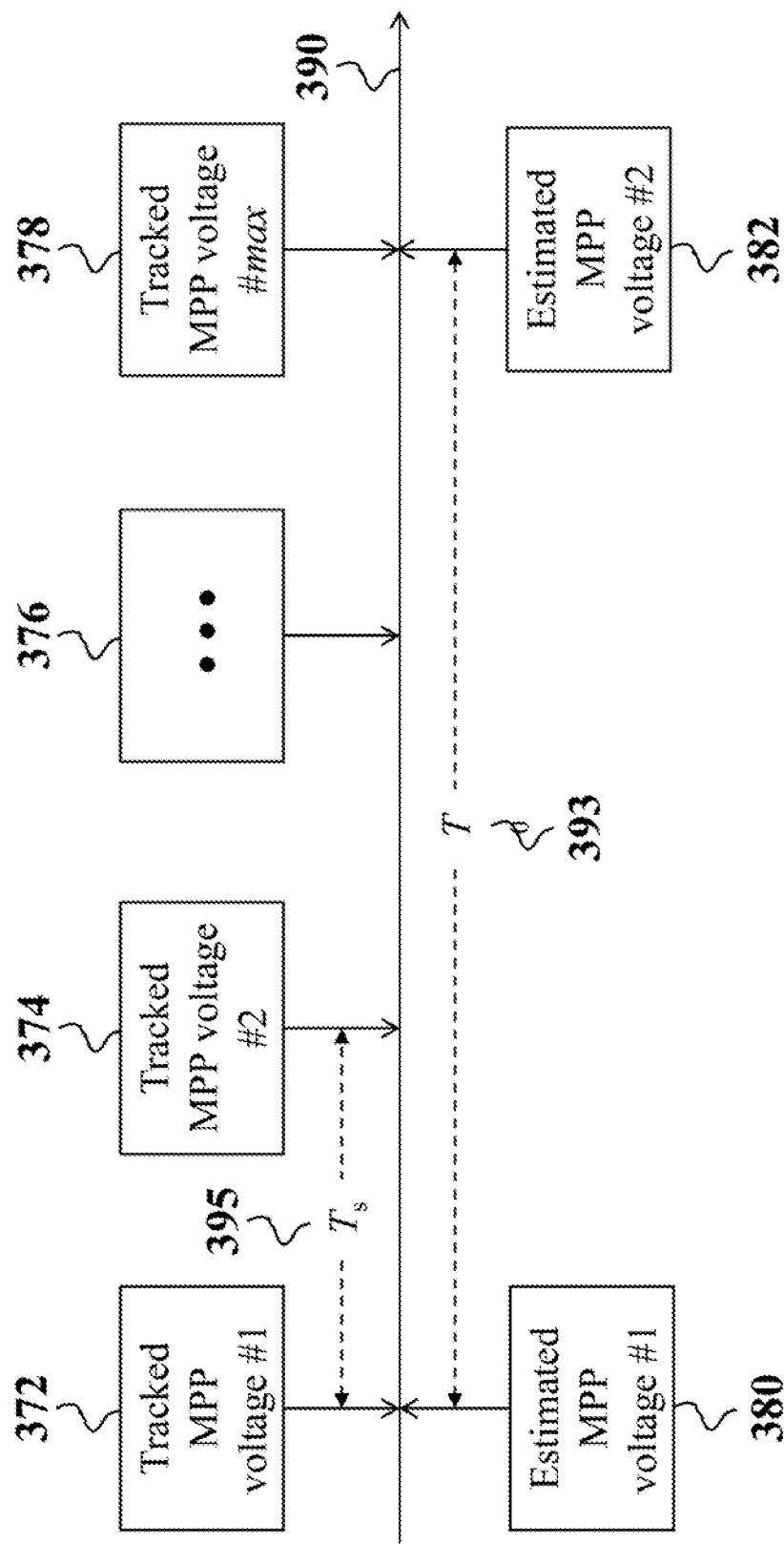
FIG. 4 is a block diagram comparing time of execution of some steps of a maximum power point tracking (MPPT) method according to one embodiment.

FIG. 4 shows a diagram comparing time of execution of some steps of the MPPT method according to one embodiment. This embodiment is based on a realization that the variation of the environmental condition is relatively slower than the switching frequency, or the time step of MPPT, of the power converter. Thus, an estimation period for voltage estimation can be longer than a tracking period for tracking the global MPP.

The axis 390 represents time. In some embodiments of the invention, the tracking period $T_s$ 395 of the MPPT tracker 360 is smaller than the estimating period $T_0$ 393 of the MPP voltage estimator 110. In other words, $T_0$ 393 is the time period between any two successive estimated MPP voltages 380 and 382 generated by the MPP voltage estimator 110. The MPP tracking 360 can be replicated and accordingly produces multiple tracked MPP voltages 370, e.g., 372, 374, 376, and 378.

Figure 5A:
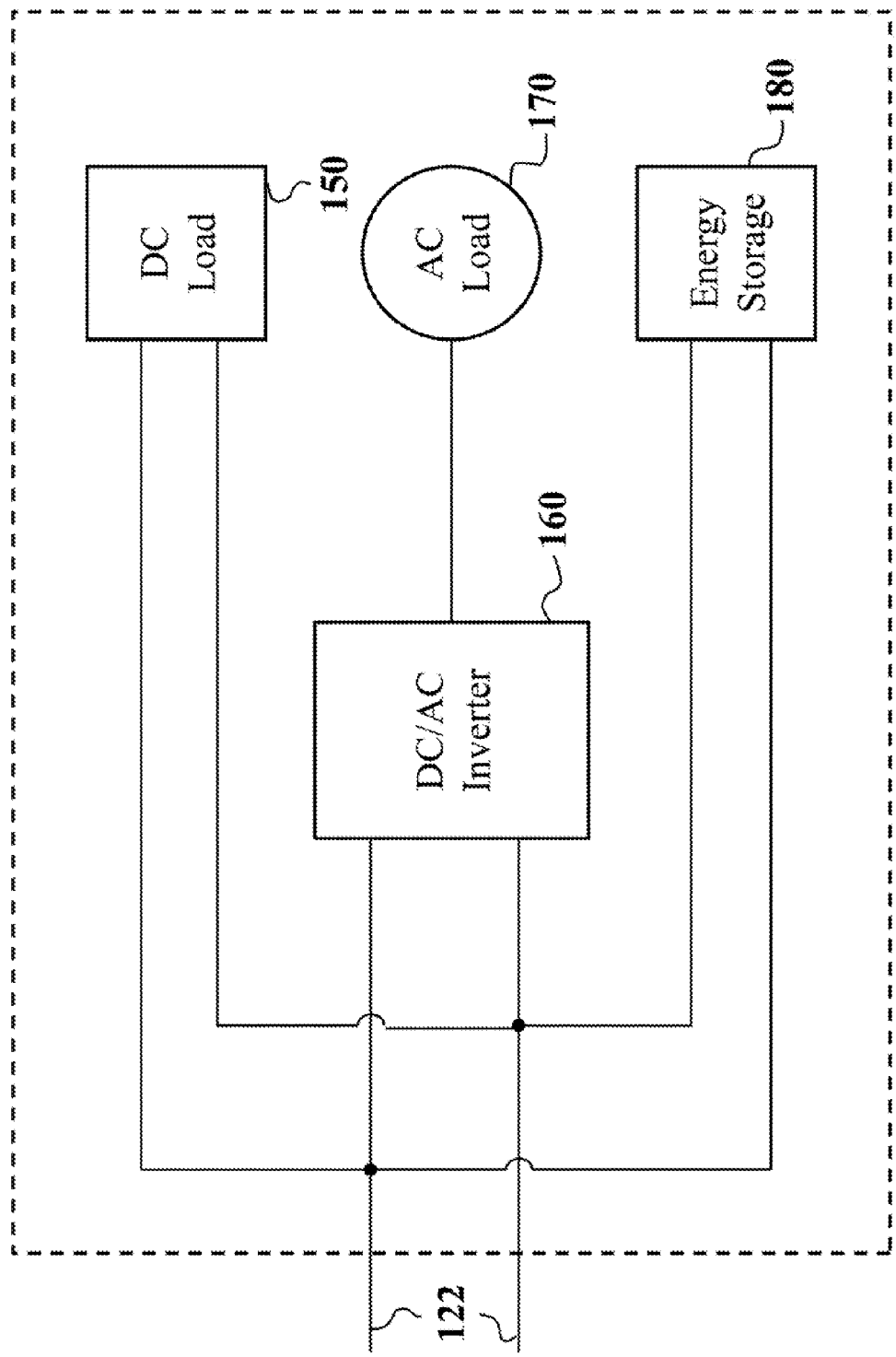
FIG. 5A is a schematic of an example of a load in FIG. 1.

FIG. 5A shows an example of the load 130 in FIG. 1. The load 130 can include either a DC load 150, or an alternating current (AC) load 170 driven by a DC/AC inverter 160, or energy storage 1180, e.g., a battery or supercapacitor. The DC/DC converter 120 can be a buck, boost, or buck-boost converters, for example.

Figure 5B:
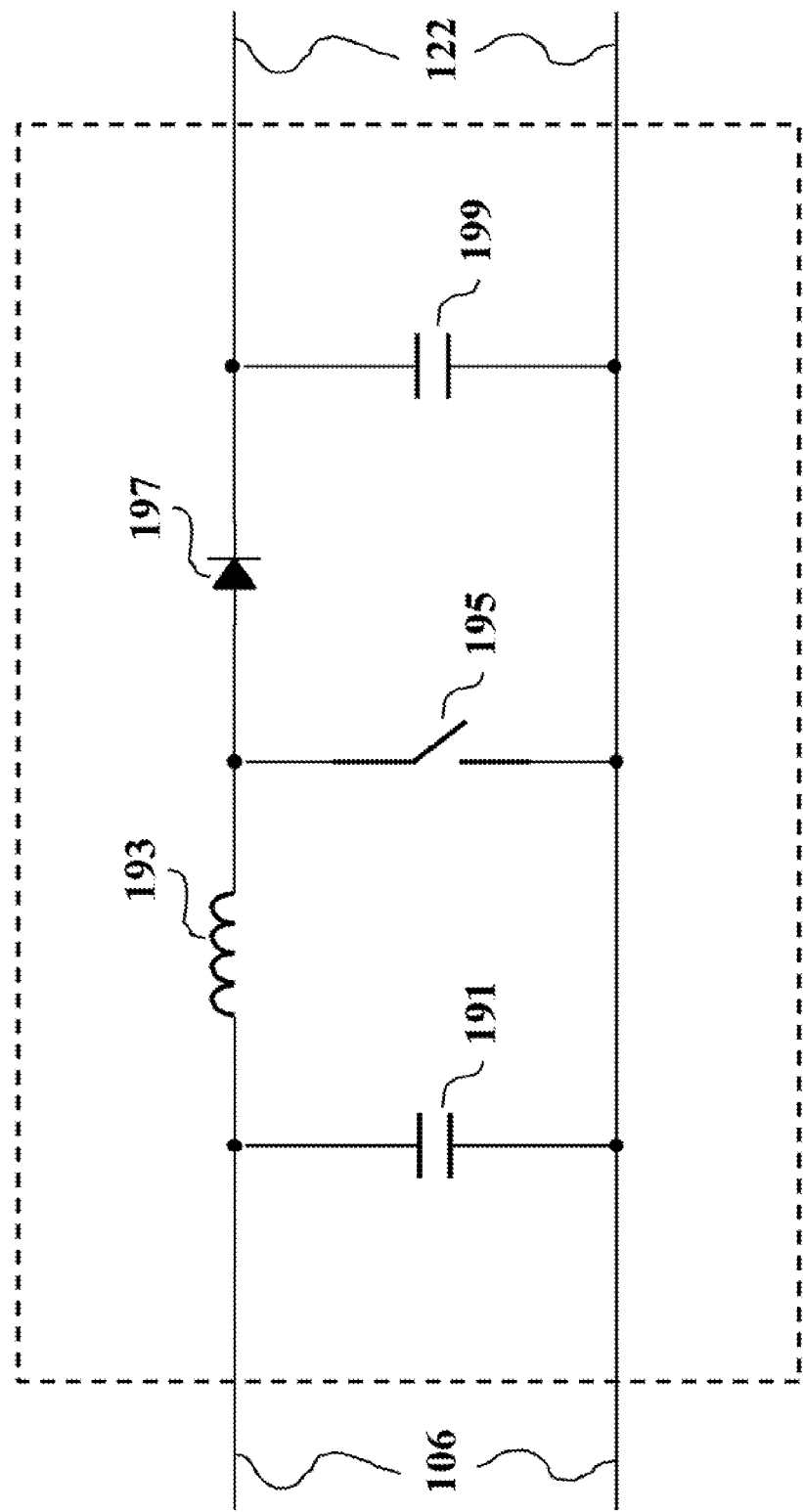
FIG. 5B is circuit diagram of an example of a power converter in FIG. 1.

FIG. 5B shows an example of a power converter, such as DC/DC converter 120, which is a boost converter. Elements 191 and 199 are capacitors, 193 is an inductor, 195 is a power semiconductor switch, and 197 is a diode. The relationship between the input voltage V (i.e., the output voltage of the photovoltaic array 100) and output voltage $V_{dc}$ (i.e., the voltage of the load 130) of the DC/DC converter 120 is $$V = V_{dc}(1 - d) \quad (1)$$

and $$d = 1 - \frac{V}{V_{dc}} \quad (2)$$

where d is the duty cycle of the power semiconductor switch 195.

Figure 6:
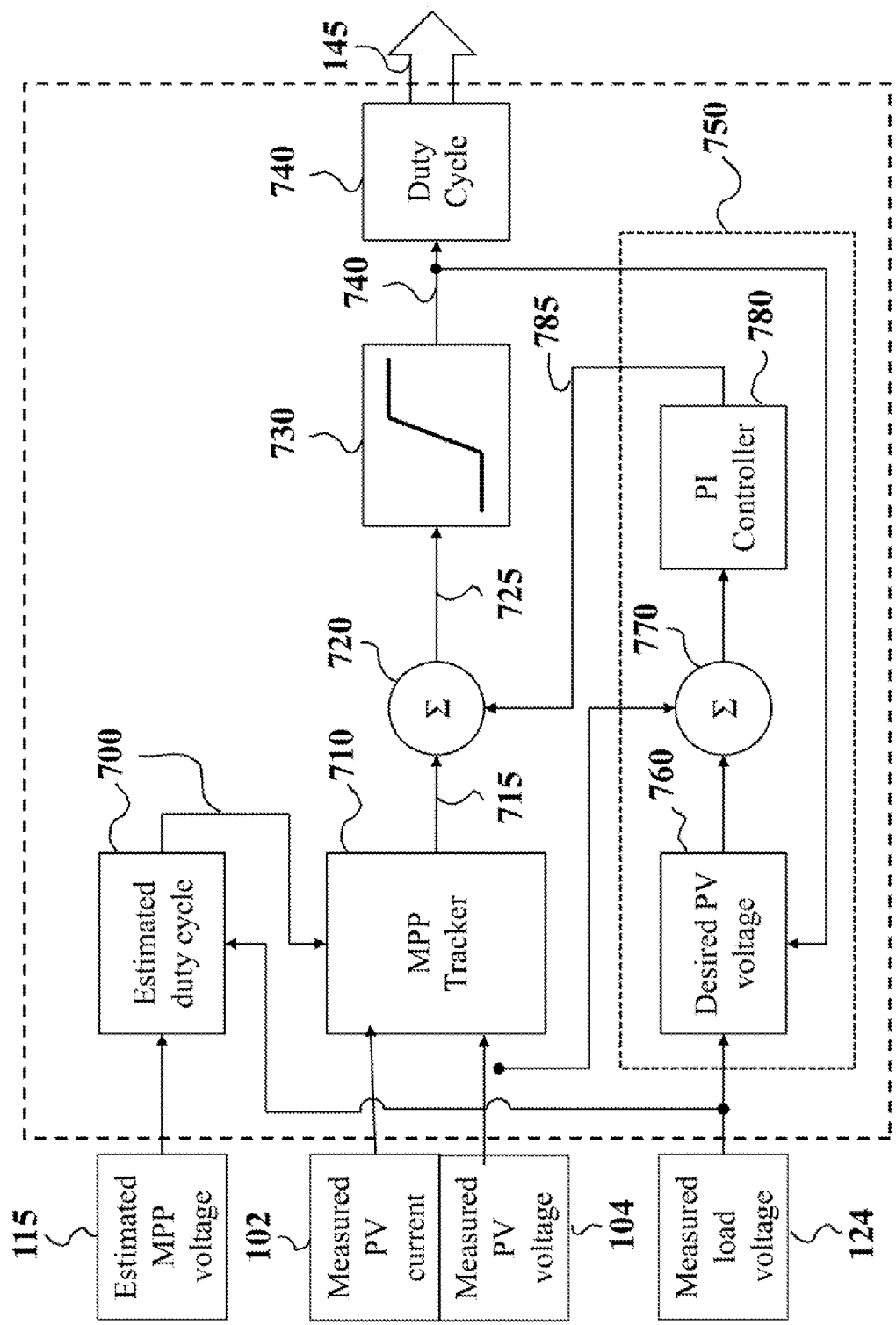
FIG. 6 is a block, diagram of the MPPT controller according to some embodiments of the invention.

FIG. 6 shows a block diagram of the MPPT controller 140 according to some embodiments of the invention. According to the estimated MPP voltage 115 generated by the MPP voltage estimator 110 and the measured load voltage 124 on line 124, the estimated duty cycle 700 of the power semiconductor switch 195 is produced based on Equation (2). Based on the estimated duty cycle 700, the measured PV current 102, and the measured PV voltage 104, the MPPT tracker 710 generates the modified duty cycle 715. The symbols 720 and 770 mean to calculate the sum of the input signals. The sum 725 of the modified duty cycle 715 and a duty cycle error 785 is sent to a limiter 730, which limits the maximum and minimum values of the input signal 725 according to the requirements of the power semiconductor switch 195. The limiter 730 generates a desired duty cycle 740 of the power semiconductor switch 195. The duty cycle 740 is decoded as the control signal 145 and sent to drive the DC/DC converter 120.

The inner loop 750 is optionally included to make the measured PV voltage 104 converge to the desired PV voltage 760 rapidly. The desired PV voltage 760 is calculated from the desired duty cycle 740 and the measured load voltage 124 based on Equation (I). The PI controller 780 generates the duty cycle error 785. A closed-loop MPPT controller shown in FIG. 6 can make the MPPT controller faster and more stable as compared with open-loop MPPT controllers.

Estimation of Maximum Power Point Voltage

Figure 7:
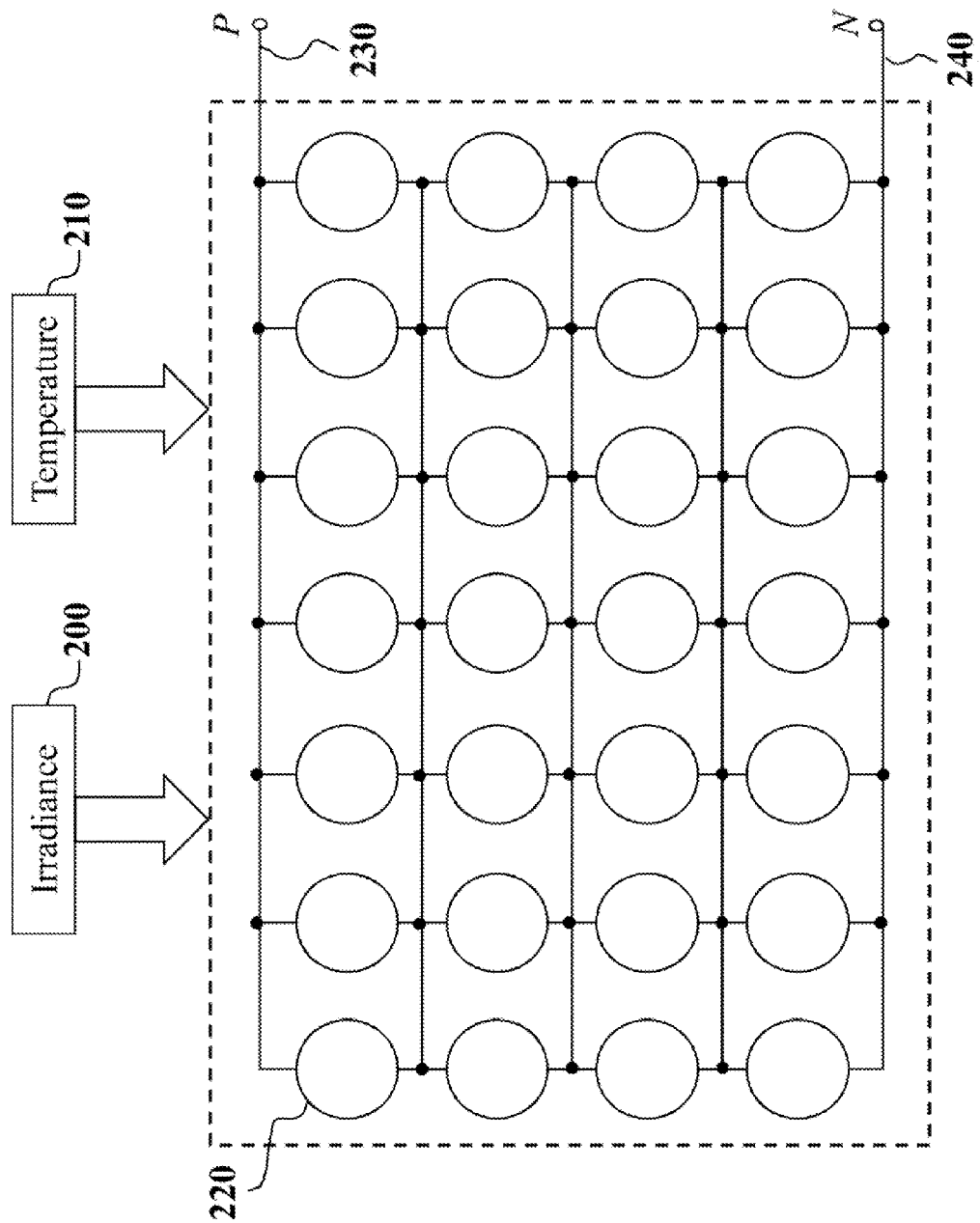
FIG. 7 is a schematic of an example of a photovoltaic array in FIG. 1.
Figure 8A:
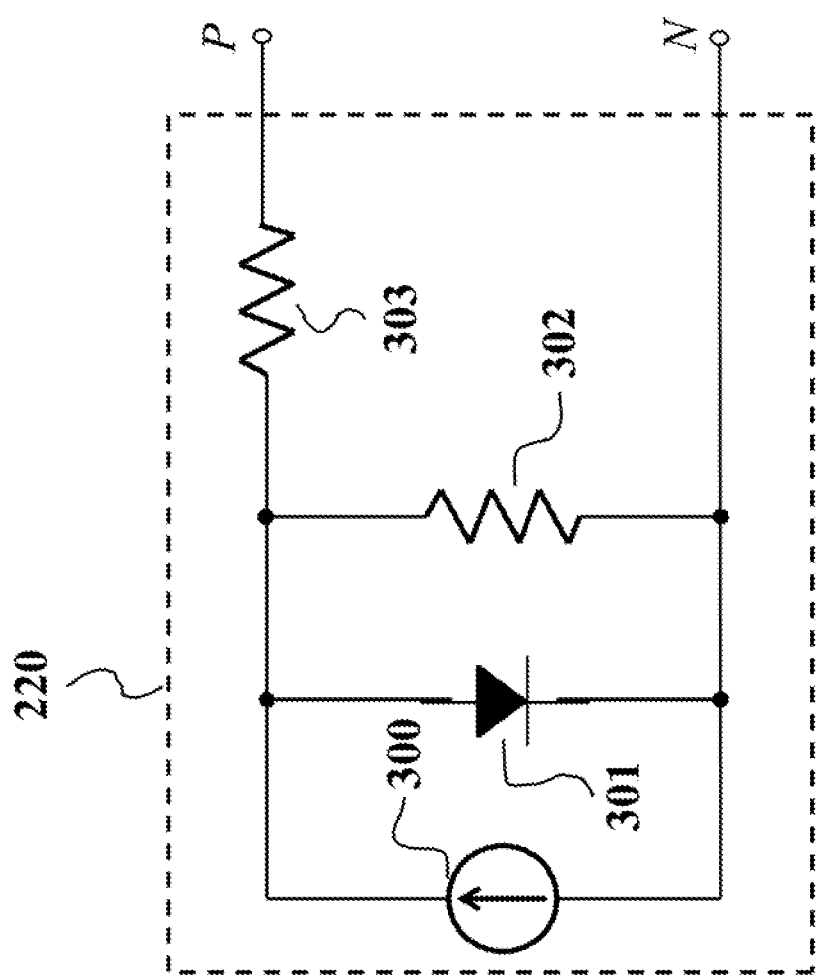
FIG. 8A is a schematic of an example of an equivalent circuit model for a photovoltaic module.

FIG. 7 shows an example of a photovoltaic array 100 constructed using photovoltaic modules 220 shown as circles. FIG. 8A shows an example of an equivalent circuit model for a photovoltaic module, e.g., 220, where 300 is the photocurrent of the photovoltaic module, 301 denotes a diode, 302 represents internal shunt resistance of the photovoltaic module, and 303 represents intrinsic series resistance of the photovoltaic module. For each photovoltaic module, e.g., 220, in the photovoltaic array 100, the output current I according to an output voltage V of the photovoltaic module is determined based on FIG. 8A as $$I = I_{ph} - I_{rs}\left\{\exp\left[\frac{A(V + IR_s)}{T}\right] - 1\right\} - \frac{V + IR_s}{R_{sh}} \quad (3)$$

where $I_{ph}$ is the photocurrent 300 of the photovoltaic module and is proportional to the solar irradiance S 200, $I_{rs}$ is the reverse saturation current of the photovoltaic module (equivalently, the diode 301) and mainly depends on the panel temperature T 210, A is a constant, $R_s$ is the intrinsic series resistance 303 of the photovoltaic module, and $R_{sh}$ is the internal shunt resistance 302 of the photovoltaic module. The values of the parameters $I_{ph}$, $I_{rs}$, $R_s$, and $R_{sh}$ are influenced by the material of the photovoltaic module.

Figure 8B:
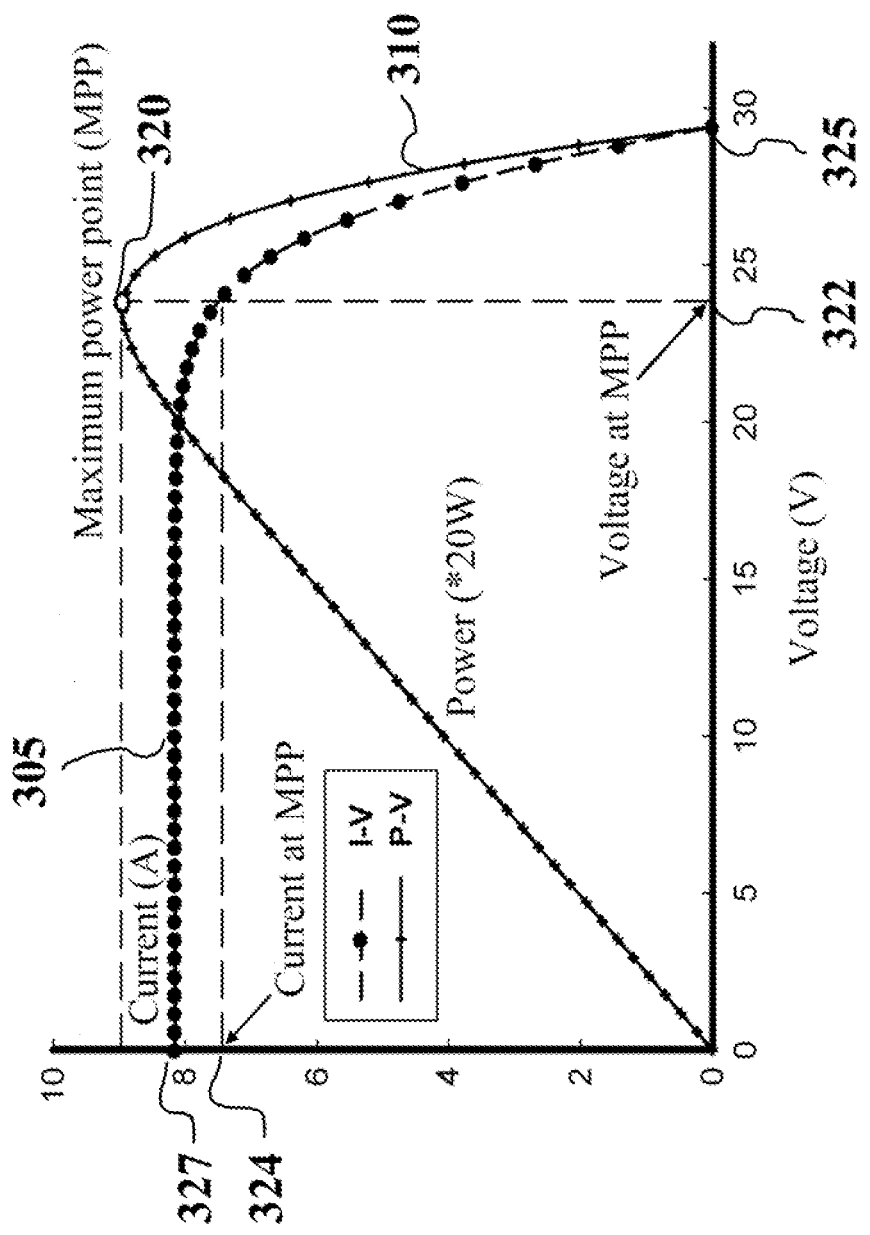
FIG. 8B is a graph showing the output characteristics of a photovoltaic module.

Based on. Equation (3), the output characteristics of a photovoltaic module, e.g., 220, according to a certain solar irradiance S 200 and panel temperature T 210 are shown in FIG. 8B. The curve 305 is the Output current according to the output voltage of the photovoltaic module (I-V), and the curve 310 represents the corresponding Output power of the photovoltaic module (P-V). It can be clearly seen that on the curve 310 there is a point 320, at which the output power of the photovoltaic module reaches its maximum value, and the point 320 is called the maximum power point (MPP). The voltage 322 and current 324 of the photovoltaic module at the maximum power point 320 are called the MPP voltage 322 and the MPP current 324, respectively. The voltage 325 of the photovoltaic module when the output current is zero is an open-circuit voltage 325 of the photovoltaic module, and the current 327 of the photovoltaic module when the output voltage is zero is a short-circuit current 327 of the photovoltaic module. Since the values of the parameters $I_{ph}$, $I_{rs}$, $R_s$, and $R_{sh}$ are influenced by the material of the photovoltaic module, for different kinds of photovoltaic modules, the MPP voltage 322, MPP current 324, open-circuit voltage 325, and short-circuit current 327 are different.

FIGS. 9A and 9B show graphs illustrating influence of the solar irradiance S 200 and the panel temperature T 210 on the output characteristics of a photovoltaic module. For a certain photovoltaic module, e.g., 229, the curves 401, 403, 405, and 407 in FIG. 9A correspond to different levels of the solar irradiance S 200, and the arrow 410 means the solar irradiance increases 400 along the direction of the arrow 410. The curves 421, 423, 425, and 427 in FIG. 9B correspond to different values of the panel temperature T 210, and the arrow 430 means the panel temperature increases 420 along the direction of the arrow 430.

Figure 10B:
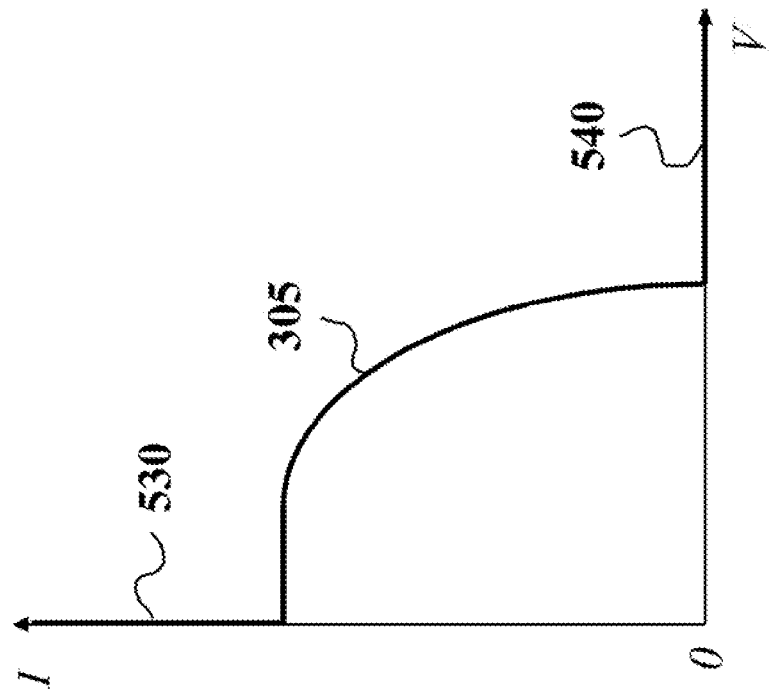
FIG. 10B is a graph showing an example of relationship between the output current and output voltage of the photovoltaic module.
Figure 10A:
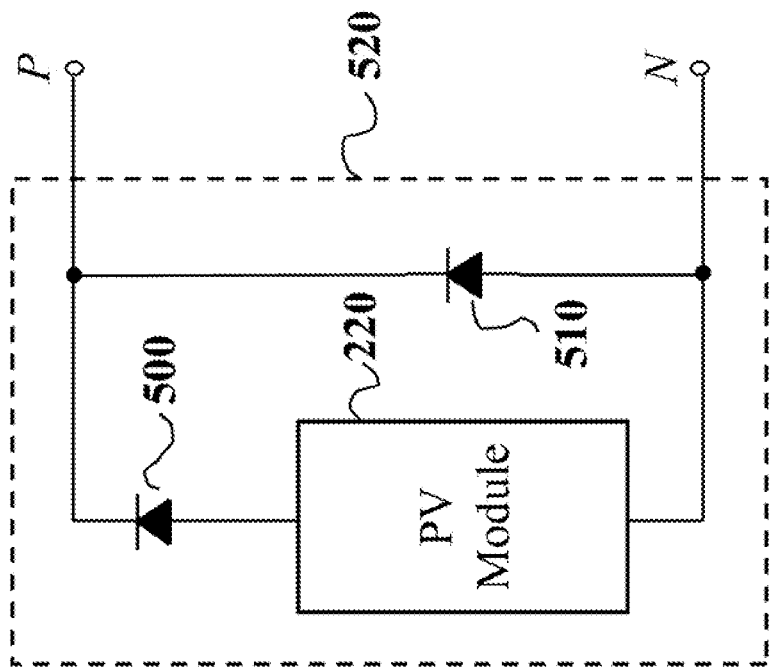
FIG. 10A is a circuit diagram of an example of architecture for a photovoltaic module in some embodiments of the invention.

FIG. 10A shows an example photovoltaic module, e.g., 220, in some embodiments of the invention. In order to protect the photovoltaic module 220, two diodes 500 and 510 are used, and the entire circuitry 520 is considered as a photovoltaic module. The relationship between the output current and output voltage of the photovoltaic module 520 is shown in FIG. 10B as the curve 305, 530 and 540. 530 is generated because of the diode 510, and the curve 540 is generated because of the diode 500. Because of the two diodes 500 and 510, the voltage or current of the photovoltaic module 220 is always positive, and thus the photovoltaic module 220 always exports power to, instead of importing power from the external circuitry, which prevents the panel temperature T 210 of the photovoltaic module 220 from increasing to an un-acceptable temperature because of absorbing power from the external circuitry. If the architecture in FIG. 10A is adopted for a photovoltaic module, e.g., 220, then the output current I according to an output voltage V of the photovoltaic module is modified based on Equation (3) as $$\begin{cases} I = \dfrac{I_{ph} - I_{rs}\left\{\exp\left[\dfrac{A(V + IR_s)}{T}\right] - 1\right\} -}{\dfrac{V + IR_s}{R_{sh}}}, & \text{if}(I \geq 0) \text{ and } (V \geq 0) \\ I = 0, & \text{if}(I < 0) \\ V = 0, & \text{if}(V < 0) \end{cases} \quad (4)$$

where the parameters $I_{ph}$, $I_{rs}$, A, T, $R_s$, and $R_{sh}$ are the same as in Equation (3).

The output current-voltage and power-voltage characteristics of the photovoltaic array 100 are different from the characteristics of a single photovoltaic module 220 shown in FIG. 8B, when the photovoltaic modules in the photovoltaic array 100 perform differently because of some reasons, e.g., the materials, solar irradiance 200 (partial shading), or panel temperature 210 of the photovoltaic modules are not the same, or the diodes 500 and 510 are added for some photovoltaic modules.

FIG. 11A-B show an example of the output current-voltage (I-V) and power-voltage (P-V) characteristics of the photovoltaic array 100 according to some embodiments of the invention. Unlike the output power of a single photovoltaic module 220 shown in FIG. 8B, there are many local maximum power points 600, 610, 620, and 630 on the output power-voltage curve of the photovoltaic array 100 shown in FIG. 11B.

FIGS. 12A, 12B, 12C, and 12D show examples of the architecture of the photovoltaic array 100 according to some embodiments of the invention. Other kinds of architecture of the photovoltaic array 100 can be derived from the architecture shown in FIGS. 12A, 12B, 12C, and 12D. The estimated MPP voltage 115 is influenced by the architecture of the photovoltaic array 100. In the example of the architecture of the photovoltaic array 100 shown in FIG. 12A, the sub-arrays 800, 810, 820, and 830 are connected in series. The symbol 820 represents the omitted sub-arrays. For each sub-array 800, 810, 820, or 830, the detailed architecture is shown in FIG. 7. The photovoltaic modules, e.g., 220, in different sub-arrays 800, 810, 820, or 830 perform differently, but the photovoltaic modules in each sub-array 800, 810, 820, or 830 perform identically. In other words, for the photovoltaic modules in each sub-array 800, 810, 820, or 830, the materials, solar irradiance 200, and panel temperature 210 are the same, and the output current of each photovoltaic module is described in Equation (3). Let the number of photovoltaic modules in series and in parallel in each sub-array, e.g., 800, be $m_1$ and $n_1$, respectively. For the sub-array shown in FIG. 7, e.g., $m_1$=4 and $n_1$=7. The output current $I_a$ of the sub-array, e.g., 800, according to an output voltage $V_a$ of the sub-array is determined based on Equation (3) as $$I_a = f(V_a, I_a) \quad (5)$$
$$= n_1 \cdot \left\{ I_{ph} - I_{rs} \left\{ \exp\left[\frac{A(V_a/m_1 + I_a R_s/n_1)}{T}\right] - 1 \right\} - \frac{V_a/m_1 + I_a R_s/n_1}{R_{sh}} \right\}$$

where the parameters $I_{ph}$, $I_{rs}$, $R_s$, $R_{sh}$, A, and T are the same as in Equation (3).

Figure 12A:
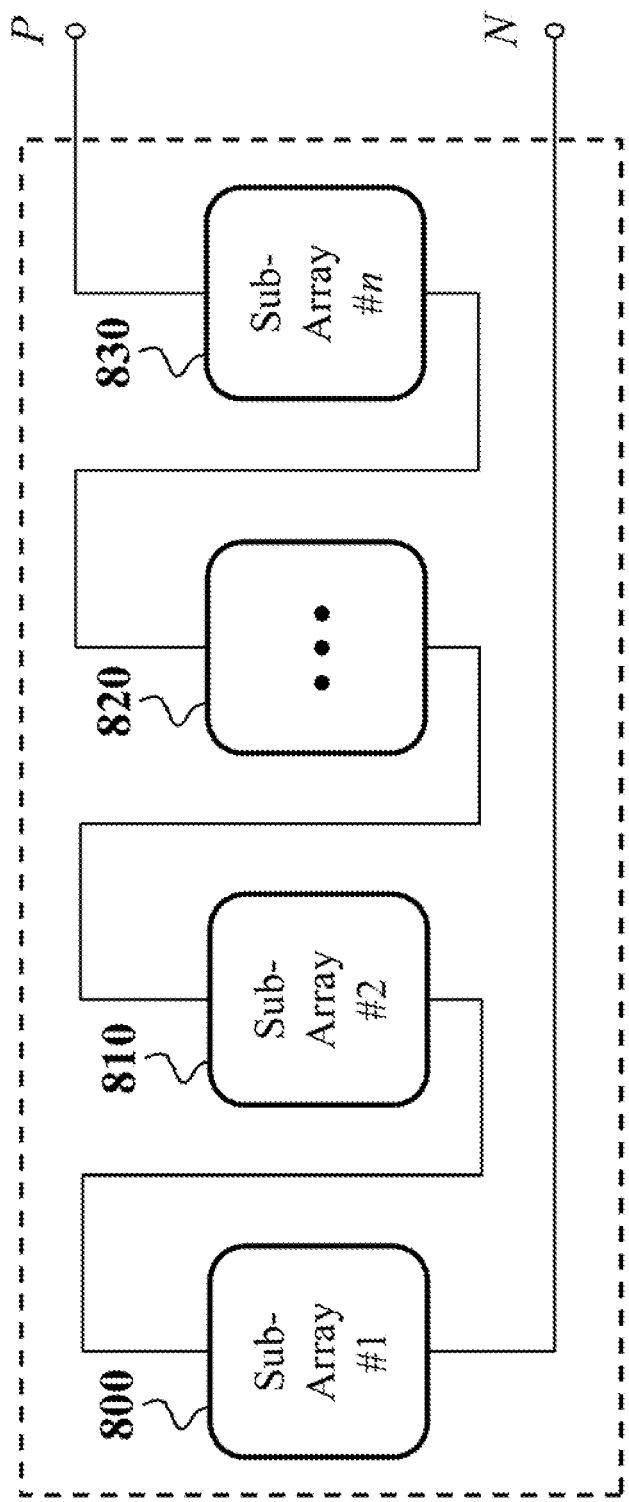
FIGS. 12A, 12B, 12C and 12D are block diagrams of examples of the architecture of the photovoltaic array according to some embodiments of the invention.
Figure 12B:
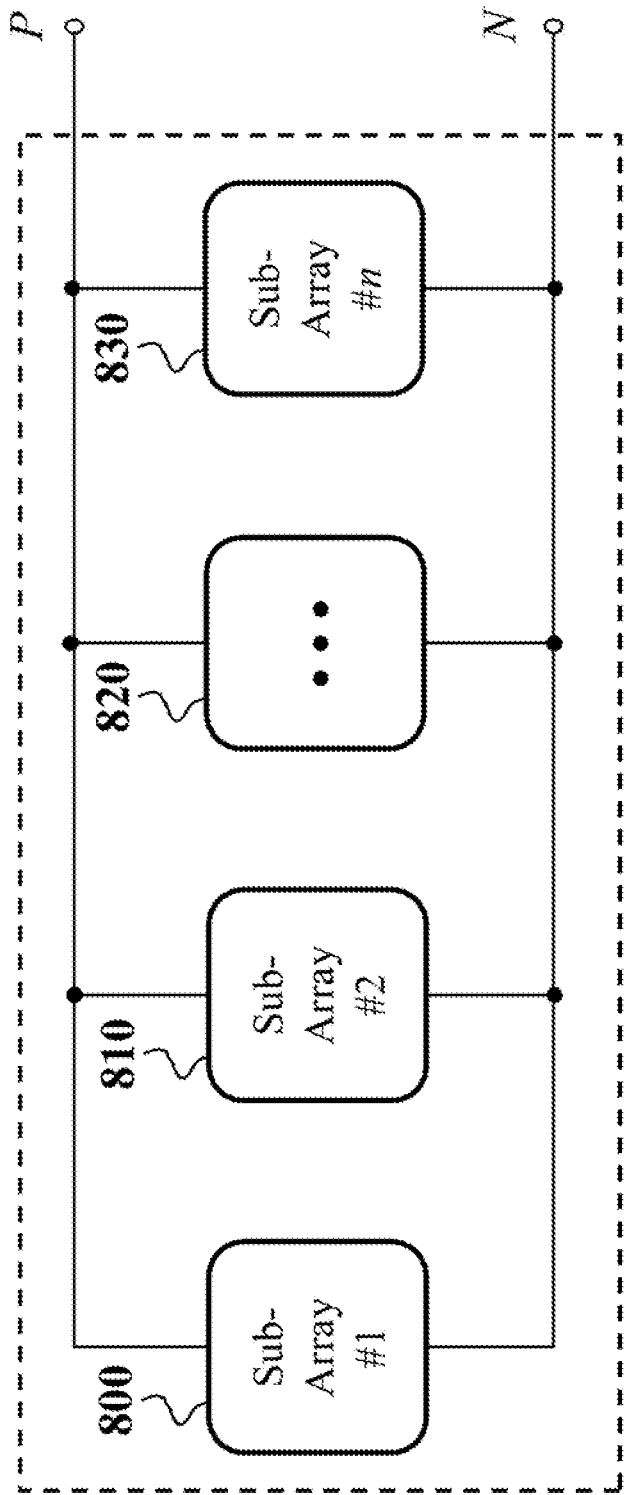

In the example of the architecture of the photovoltaic array 100 shown in FIG. 12B, the sub-arrays 800, 810, 820, and 830 are connected in parallel. The output current of each sub-array 800, 810, 820, or 830 is expressed in Equation (5). In another example of the architecture of the photovoltaic array 100 shown in FIG. 12C, the sub-arrays 840 and 850 are in parallel, but each sub-array, e.g., 840, is constructed by smaller sub-arrays 842, 844, 846, and 848 series connected as in FIG. 12A. In another example of the architecture of the photovoltaic array 100 shown in FIG. 12D, the sub-arrays 860 and 870 are connected in series, but each sub-array, e.g., 860, is constructed by smaller sub-arrays 862, 864, 866, and 868 parallel connected as in FIG. 12B. Other kinds of architecture of the photovoltaic array 100 can be derived from the architecture shown in FIGS. 12A, 12B, 12C and 12D.

In some embodiments of the invention, the estimated MPP voltage 115 is generated based on particle swarm optimization (PSO) by minimizing an objective function. Other methods, such as Newton-Raphson method, for estimating the voltage can also be used. However, in some embodiments, the PSO method is faster and easier to implement than the Newton-Raphson method, especially when the architecture of the photovoltaic array is complicated and the output characteristics of the photovoltaic array are non-differentiable, e.g., as caused by protective diodes 500 and 510 shown in FIG. 10A.

For the example of the architecture of the photovoltaic array 100 shown in FIG. 12A, the objective function according to some embodiments of the invention is selected as $$J_1 = \Sigma_{k=1}^n \delta_k (I - f_k)^2 - \beta \Sigma_{k=1}^n U_k f_k \quad (6)$$

where n is number of sub-arrays 800, 810, 820, and 830 in FIG. 12A; $\delta_k$(k=1, 2, ... n) and $\beta$ are weighting factors; $U_k$(k=1, 2, ..., n) is the output voltage of the $k^{th}$ sub-array, e.g., 800 when k=1, in FIG. 12A; I denotes the output current of the sub-arrays 800, 810, 820, and 830 in FIG. 12A; $f_k$(k=1, 2, ..., n) is the output current of the $k^{th}$ sub-array calculated by Equation (5) as $f_k$=f($U_k$, I).

For example, if the architecture in FIG. 10A is adopted for the $k^{th}$ sub-array, then $f_k$ is calculated as $$f_k = \begin{cases} f(U_k, I), & \text{if}(U_k \geq 0) \text{ and } (I \geq 0) \\ I, & \text{if}(U_k < 0) \\ 0, & \text{if}(I < 0) \end{cases} \quad (7)$$

where the function f($U_k$, I) is shown in Equation (5).

A potential solution for minimizing the objective function is called a "particle". For the example of the architecture of the photovoltaic array 100 shown in FIG. 13A, the "position" of a particle according to some embodiments of the invention can be represented as $$x_i = [U_1, U_2, \ldots U_n, I] \quad (8)$$

where n is number of sub-arrays 800, 810, 820, and 830 in FIG. 12A; $U_k$(k=1, 2, ..., n) is the output voltage of the $k^{th}$ sub-array, e.g., 800 when k=1, in FIG. 12A; I denotes the output current of the. Sub-arrays 800, 810, 820, and 830 in FIG. 12A; and i=1, 2, ..., N, where N is the number of particles.

Figures 13A, 13B:
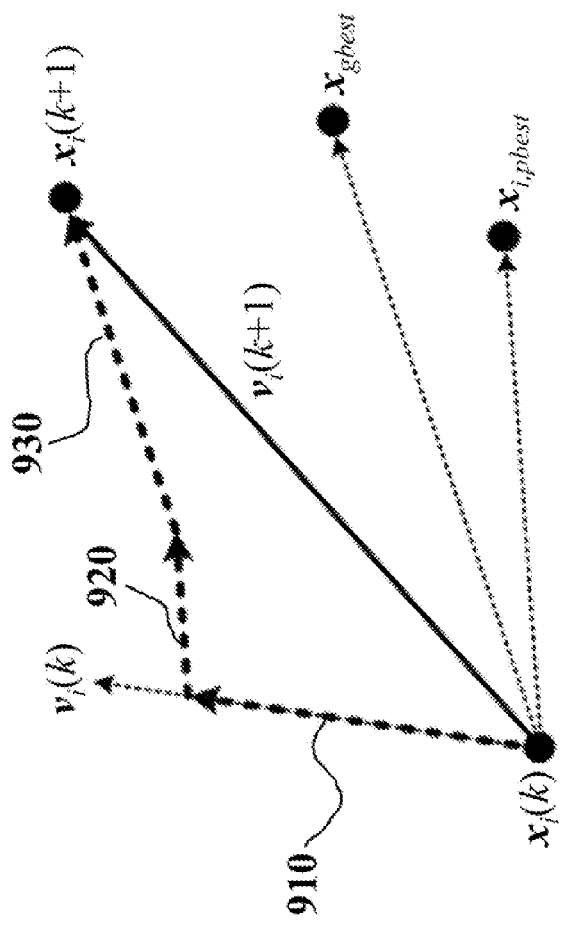
FIGS. 13A and 13B are schematics of an update and stochastic adjustment of each particle in a particle swarm optimization (PSO) method according to some embodiments of the invention.

FIGS. 13A and 13B show update and stochastic adjustment of each particle. For example, each particle is as shown in FIG. 13A according to $$x_i(k+1) = x_i(k) + v_i(k+1) \quad (9)$$

where $x_i$(k+1) and $x_i$(k) are the values of $x_i$ at the $(k+1)^{th}$ and $k^{th}$ iteration, k=1, 2, ... iter, where iter means the maximum iteration, and $v_i$(k+1) is called "velocity" for $x_i$ at the $(k+1)^{th}$ iteration and is stochastically adjusted in the following way as shown in FIGS. 13A and 13B according to $$v_i(k+1) = w \cdot v_i(k) + c_1 \phi_1 \cdot [x_{i,pbest}(k) - x_i(k)] + c_2 \phi_2 \cdot [x_{gbest}(k) - x_i(k)] \quad (10)$$

where w is called an "inertia constant", $c_1$ and $c_2$ are called "acceleration constants," $\phi_1$ and $\phi_2$ are random numbers in the range $0 \leq \phi_1, \phi_2 \leq 1$, $x_{i,pbest}$(k) is called the "personal optimum" for $x_i$ until the $k^{th}$ iteration which produces the minimum value of the objective function among $x_i$(1), $x_i$(2), ..., $x_i$(k); $x_{gbest}$(k) is called the "global optimum" until the $k^{th}$ iteration, which produces the minimum value of the objective function among all the "personal optimum" $x_{1,pbest}$(k), $x_{2,pbest}$(k), ... $x_{N,pbest}$(k). The velocity $v_i$(k+1) in Equation (9) and Equation (10) controls the optimization process and reflects the socially exchanged information.

In some embodiments, a performance measure function err is adopted to evaluate the solution of the PSO $$\text{err} = \rho_1 \|\bar{x}_{pbest}(k) - x_{gbest}(k)\| + \rho_2 |\Delta J_{min}(k)| + \rho_3 \|\Delta x_{gbest}(k)\| \quad (11)$$

where k=2, 3, ..., iter; $\rho_1$, $\rho_2$, and $\rho_3$ are weighting factors to satisfy different design requirements; $\bar{x}_{pbest}$(k) means the average of all the "personal optimum" $x_{1,best}$(k), $x_{2pbest}$(k), ... $x_{N,pbest}$(k) at the $k^{th}$ iteration in Equation (10), i.e., $$\bar{x}_{pbest}(k) = \frac{1}{N} \sum_{i=1}^{N} x_{i,pbest}(k); \quad (12)$$

$x_{gbest}$(k) is the "global optimum" as in Equation (10); $\Delta J_{min}$(k) is the difference between the minimum of the objective function for all the particles at the $k^{th}$ iteration, named $J_{min}$(k), and at the $(k-1)^{th}$ iteration, named $J_{min}$(k-1), i.e., $\Delta J_{min}$(k)=$J_{min}$(k)−$J_{min}$(k-1); $\Delta x_{gbest}$(k) is the difference between the "global optimum" at the $k^{th}$ iteration $x_{gbest}$(k) and at the $(k-1)^{th}$ iteration $x_{gbest}$(k-1), i.e., $\Delta x_{gbest}$(k)=$x_{gbest}$(k)−$x_{gbest}$(k-1), in addition, $\|\cdot\|$ means the norm of a vector and $|\cdot|$ means the absolute value of a scalar number. The PSO is implemented by computing Equations (9)-(12) repeatedly until the maximum iteration iter, or other termination condition is achieved. The terminal condition can be based on a value of the objective function or a performance measure function err. The final value of the "global optimum", called $x_{gbest}$, is regarded as the optimal solution of the problem, i.e., the particle in Equation (8) minimizing the objective function.

Figure 14:
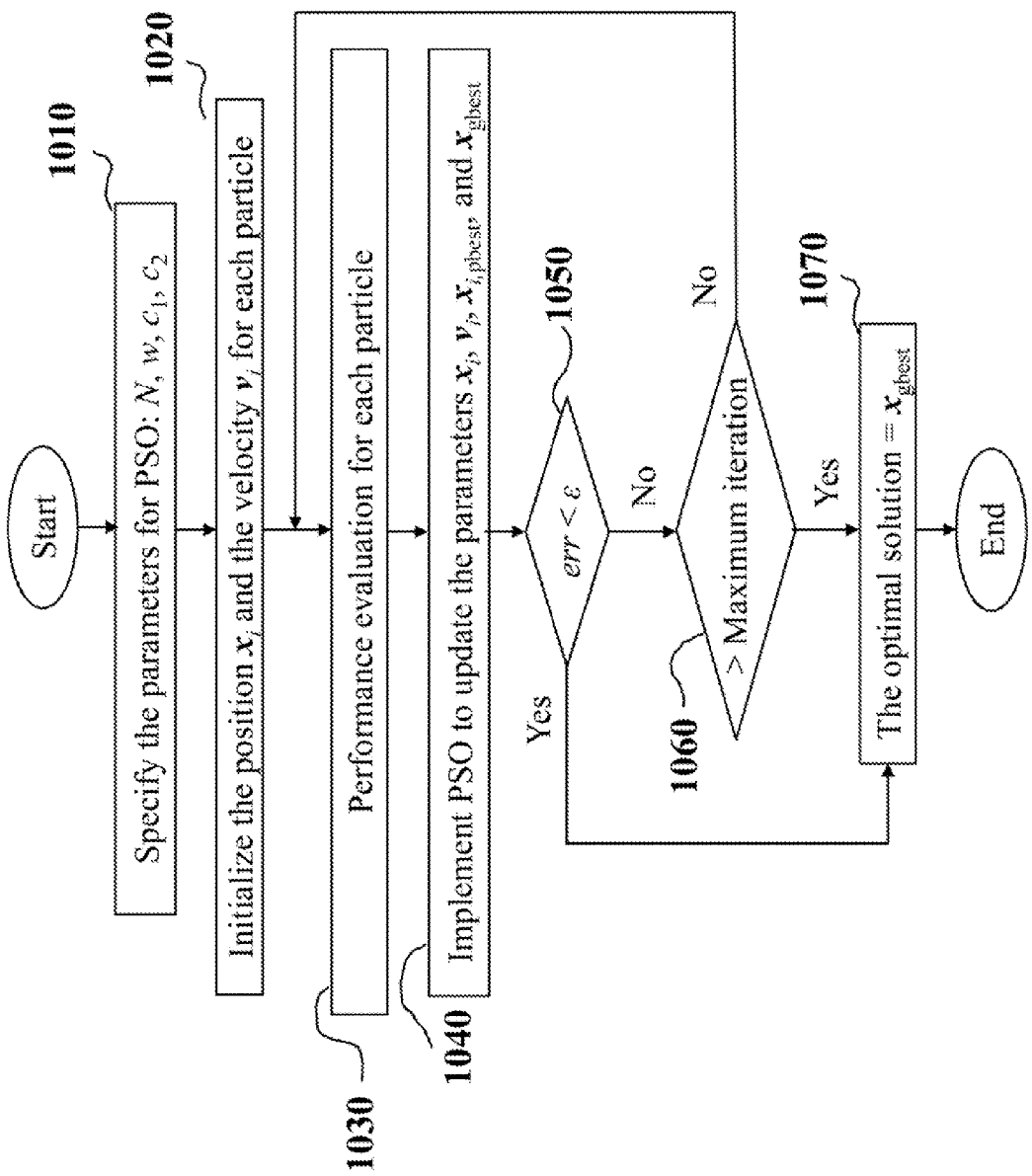
FIG. 14 is a flow chart of PSO method according to some embodiments of the invention.

FIG. 14 shows a flow chart of PSO method according to some embodiments of the invention. A step 1010 specifies the parameters in Equation (10); 1020 initializes the "position" and "velocity" for each particle in Equation (8)-(10); 1030 evaluates the performance of the particles, i.e., the corresponding value of the objective function for each particle; 1040 updates the "position", "velocity", and "personal optimum" for each particle and the "global optimum" based on Equation (9) and Equation (10); 1050 compares the performance measure function err in Equation (11) with a selected tolerance $\epsilon$ of error, e.g., $\epsilon=10^{-6}$; 1060 examines whether the iteration reaches the maximum iter; 1070 produces the optimal solution $x_{gbest}$ for the problem.

Based on $x_{gbest}$, the estimated MPP voltage 115 is obtained. For the example of the architecture of the photovoltaic array 100 shown in FIG. 12A, the estimated MPP voltage 115 is $$V_{est} = \Sigma_{k=1}^{n} U_k \quad (13)$$

where n is number of sub-arrays 800, 810, 820, and 830 in FIG. 12A; $U_k$ (k=1, 2, ..., n) is the output voltage of the $k^{th}$ sub-array in Equation (8) according to $x_{gbest}$.

For the architecture of the photovoltaic array 100 shown in FIG. 12B, the objective Junction according to some embodiments of the invention is $$J_2 = \Sigma_{k=1}^{n} \delta_k (I_k - f_k)^2 - \beta \Sigma_{k=1}^{n} U \cdot f_k \quad (14)$$

where n is number of sub-arrays 800, 810, 820, and 830 in FIG. 12B; $\delta_k$ (k=1, 2, ..., n) and $\beta$ are weighting factors; $I_k$ (k=1, 2, ..., n) is the output current of the $k^{th}$ sub-array, e.g., 800 when k=1, in FIG. 12B; U denotes the output voltage of the sub-arrays 800, 810, 820, and 830 in FIG. 12B; $f_k$ (k=1, 2, ..., n) is the output current of the $k^{th}$ sub-array calculated by Equation (5) as $f_k = f(U, I_k)$. Accordingly, for the architecture of the photovoltaic array 100 shown in FIG. 12B, the particle according to some embodiments of the invention can be selected as $$x_i = [I_1, I_2, \ldots I_n, U] \quad (15)$$

and based on the optimal solution $x_{gbest}$ obtained from PSO as shown in FIG. 14, the estimated MPP voltage 115 is $$V_{est} = U \quad (16)$$

where U is the output voltage of the sub-arrays in Equation (15) according to $x_{gbest}$.

Figure 12C:
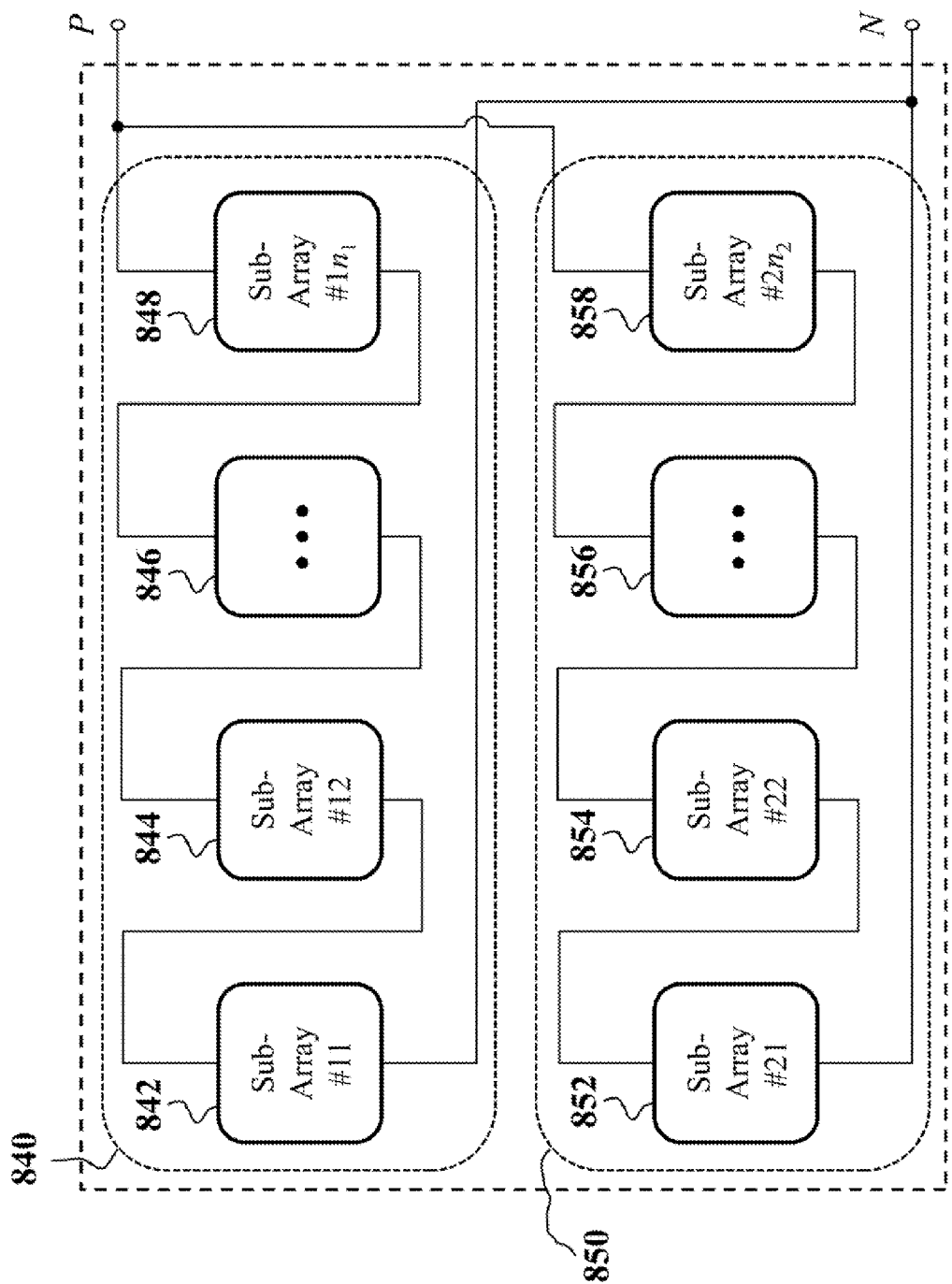

For the architecture of the photovoltaic array 100 shown in FIG. 12C, the objective function according to some embodiments of the invention is $$J_3 = \Sigma_{h=1}^{m} [\Sigma_{k=1}^{n_h} (\delta_{h,k}(I_h - f_{h,k})^2 - \beta_h U_{h,k} f_{h,k}) + \gamma_h (\Sigma_{k=1}^{n_h} U_{h,k} - U_o)^2] \quad (17)$$

where m is number of bigger sub-arrays 840 and 850 in FIG. 12C (e.g. m=2 for FIG. 12C); $n_h$ is number of smaller sub-arrays 842, 844, 846, and 848 for the $h^{th}$ (h=1, 2, ..., m) bigger sub-array in FIG. 12C; $\delta_{h,k}$ (k=1, 2, ..., $n_h$), $\beta_h$ and $\gamma_h$ are weighting factors; $I_h$ is the output current of the $h^{th}$ bigger sub-array in FIG. 12C; $U_o$ denotes the output voltage of the bigger sub-arrays 840 and 850 in FIG. 12C; $U_{h,k}$ is the output voltage of the $k^{th}$ smaller sub-array in the $h^{th}$ bigger sub-array; $f_{h,k}$ is the output current of the $k^{th}$ smaller sub-array in the $h^{th}$ bigger sub-array calculated by Equation (5) as $f_{h,k} = f(U_{h,k}, I_h)$. Accordingly, for the architecture of the photovoltaic array 100 shown in FIG. 12C, the particle according to sonic embodiments of the invention can be selected as $$x_i = [U_{1,1}, \ldots U_{1,n_1}, I_1, \ldots U_{m,1}, \ldots U_{m,n_m}, I_m, U_o] \quad (18)$$

and based on the optimal solution $x_{gbest}$ obtained from PSO as shown in FIG. 14, the estimated MPP voltage 115 is $$V_{est} = U_o \quad (19)$$

where $U_o$ is the output voltage of the bigger sub-arrays in Equation (8) according to $x_{gbest}$.

Figure 12D:
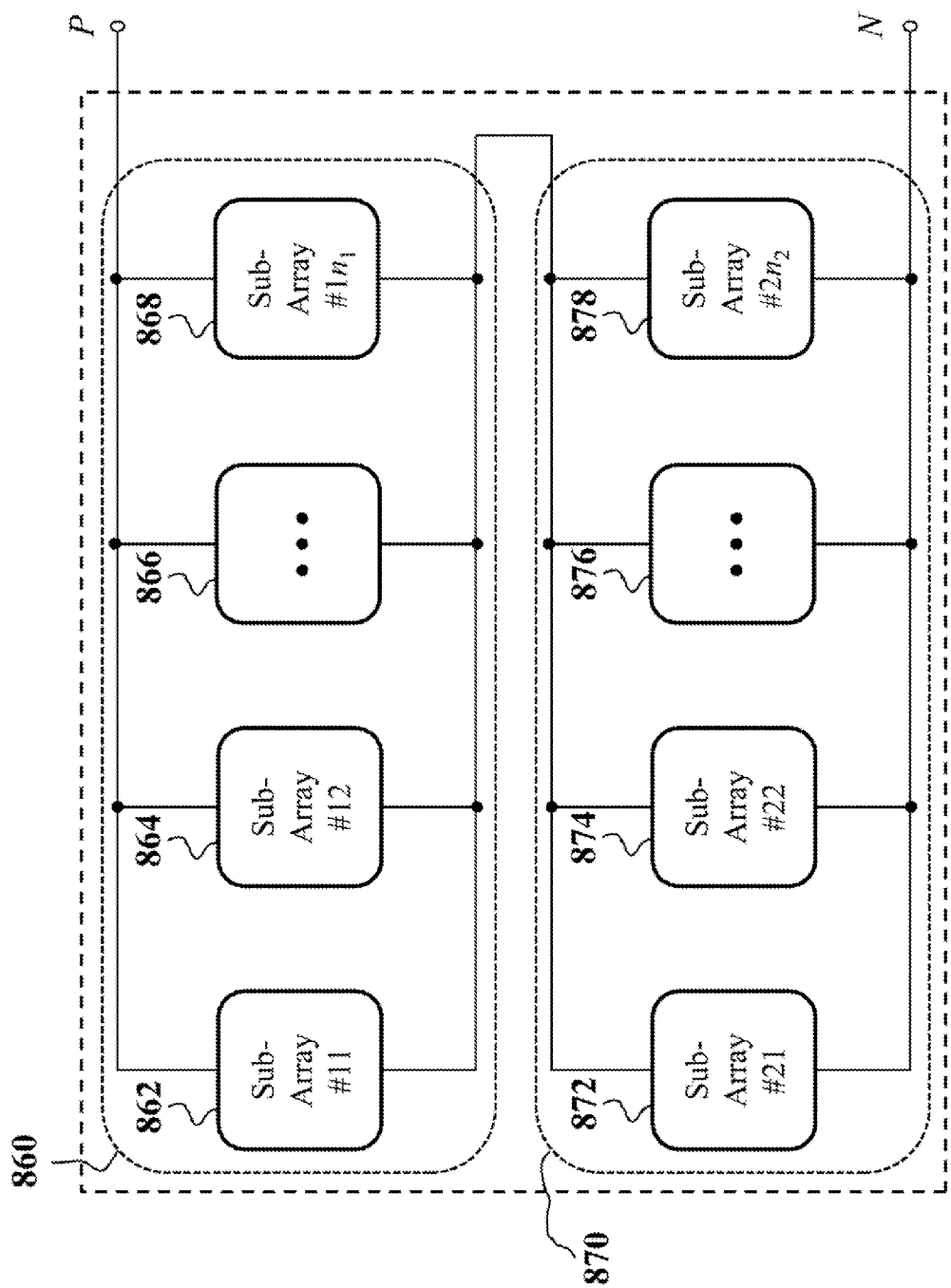

For the architecture of the photovoltaic array 100 shown in FIG. 12D, the objective function according to some embodiments of the invention is selected as $$J_4 = \Sigma_{h=1}^{m} [\Sigma_{k=1}^{n_h} (\delta_{h,k}(I_{h,k} - f_{h,k})^2 - \beta_h U_h f_{h,k}) + \gamma_h (\Sigma_{k=1}^{n_h} I_{h,k} - I_o)^2] \quad (20)$$

where m is number of bigger sub-arrays 860 and 870 in FIG. 12D (e.g., m=2 for FIG. 12D); $n_h$ is number of smaller sub-arrays 862, 864, 866, and 868 for the $h^{th}$ (h=1, 2, ..., m) bigger sub-array in FIG. 12D; $\delta_{h,k}$ (k=1, 2, ..., $n_h$), $\beta_h$ and $\gamma_h$ are weighting factors; $U_h$ is the output voltage of the $h^{th}$ bigger sub-array in FIG. 12D; $I_o$ denotes the output current of the bigger sub-arrays 860 and 870 in FIG. 12D; $I_{h,k}$ is the output current of the $k^{th}$ smaller sub-array in the $h^{th}$ bigger sub-array; $f_{h,k}$ is the output current of the $k^{th}$ smaller sub-array in the $h^{th}$ bigger sub-array calculated by Equation (5) $f_{h,k} = f(U_h, I_{h,k})$. Accordingly, for the architecture of the photovoltaic array 100 shown in FIG. 12D, the particle according to some embodiments of the invention can be selected as $$x_i = [I_{1,1}, \ldots I_{1,n_1}, U_1, \ldots I_{m,1}, \ldots I_{m,n_m}, U_m, I_o] \quad (21)$$

and based on the optimal solution $x_{gbest}$ obtained from PSO as shown in FIG. 14, the estimated MPP voltage 115 is $$V_{est} = \Sigma_{h=1}^{m} U_h \quad (22)$$

where $U_h$ is the output voltage of the $h^{th}$ bigger sub-array in Equation (21) according to $x_{gbest}$.

Other kinds of architecture of the photovoltaic array 100 can be derived from the architecture shown in FIGS. 12A, 12B, 12C, and 12D, so the estimated MPP voltage 115 can be calculated accordingly.

Maximum Power Point Tracking

Figure 15:
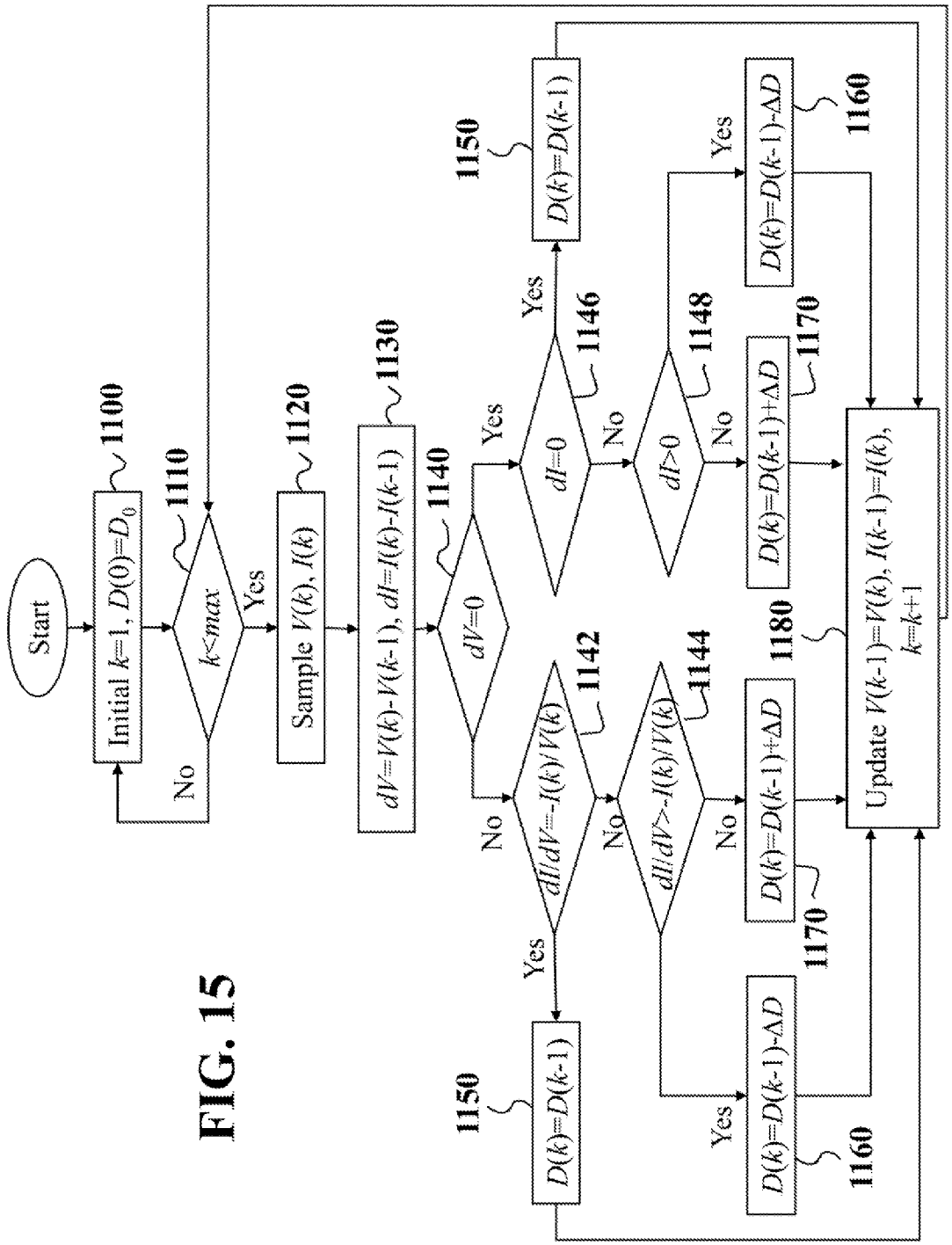
FIG. 15 is an example of a flow chart for the method for a MPPT method according to some embodiments of the invention.

FIG. 15 shows an example of a flow chart for the MPPT tracker 710 according to some embodiments of the invention. 1100 initializes the modified duty cycle 715 D(0) to the estimated duty cycle 700 $D_0$ based on Equation (2) as $$D(0) = D_0 = 1 - \frac{V_{est}}{V_{dc}} \quad (23)$$

where $V_{dc}$ is the output voltage of the DC/DC converter 120, and $V_{est}$ is the estimated MPP voltage 115 generated by the MPP voltage estimator 110 as in Equation (13), (16), (19), or (22).

In some embodiments of the invention, the tracking interval $T_s$ 395 of the MPPT tracker 710 is smaller than the estimating interval $T_0$ 393 of the MPP voltage estimator 110. In other words, after an estimated MPP voltage 115 is generated by the MPP voltage estimator 110, the MPPT tracker 710 implements the calculation in FIG. 15 max times until a next estimated MPP voltage 115 is generated by the MPP voltage estimator 110, where $$\max = T_0/T_s \quad (24)$$

1110 examines whether the iteration k reaches the maximum (max). In other embodiments of the invention, the sampling interval $T_s$ of the MPPT tracker 710 is equal to the generating interval $T_0$ of the MPP voltage estimator 110 (i.e., max=1), then the modified duty cycle 715 is actually the estimated duty cycle 700.

The measured PV current 102 I(k) is sampled 1120, and the measured PV voltage 104 V(k), at each iteration ($k^{th}$). 1130 calculates the change of the measured PV current 102 (i.e., dI) and of the measured PV voltage 104 (i.e., dV) between the $k^{th}$ and $(k-1)^{th}$ iteration. Step 1140 examines whether dV is equal to zero. Steps 1142 and 1144 validate whether dI/dV is equal to or larger than $-I(k)/V(k)$, respectively. Steps 1146 and 1148 examine whether dI is equal to or larger than zero, respectively. Step 1150 updates the modified duty cycle 715 D(k) at the $k^{th}$ iteration as D(k)=D(k-1). Step 1160 and 1170 update the modified duty cycle 715 D(k) at the $k^{th}$ iteration as D(k)=D(k-1)$-\Delta$D and D(k)=D(k-1)$+\Delta$D, respectively, where $\Delta$D is a size of modification for the modified duty cycle 715, and $\Delta$D can be a constant or a variable, according to the application requirements.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format. The processor can be connected to memory, transceiver, and input/output interfaces as known in the art.

Also, the various methods or processes outlined herein may be coded as software that is executable on one or more processors that employ any one of a variety of operating systems or platforms. Alternatively or additionally, the invention may be embodied as a computer readable medium other than a computer-readable storage medium, such as signals.

The terms "program" or "software" are used herein in a generic sense to refer to any type of computer code or set of computer-executable instructions that can be employed to program a computer or other processor to implement Various aspects of the present invention as discussed above.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

The invention claimed is:

1. A method for controlling power generated by a photovoltaic array, comprising:
    estimating a voltage corresponding to a global maximum power point (MPP) of the power generated by the photovoltaic array to produce an estimated voltage;
    tracking an output of the power based on the estimated voltage to determine the global MPP, wherein steps of the method are performed by a processor;
    generating a control signal to control an operation of a power converter in accordance with the global MPP, wherein the power converter includes a switch and the control signal includes a desired duty cycle of the switch;
    determining an estimated duty cycle of the switch according to $$d = 1 - \frac{V}{V_{dc}},$$

wherein d is the estimated duty cycle, V is the estimated voltage, $V_{dc}$ is an output voltage of a load;
    modifying the estimated duty cycle according to the global MPP using a measured current and a measured voltage of the photovoltaic array to produce a modified duty cycle; and
    adjusting the modified duty cycle with a duty cycle error to produce the desired duty cycle, wherein the duty cycle error represents the difference between the measured voltage and a desired voltage of the photovoltaic array calculated based on the desired duty cycle and the voltage of the load.

2. The method of claim 1, wherein the tracking is based on measured voltage and current signals of the photovoltaic array and a measured voltage signal of a load powered by the photovoltaic array.

3. The method of claim 1, wherein the estimating is performed each estimating period, and the tracking is performed each tracking period, such that the estimating period is longer than the tracking period.

4. The method of claim 1, wherein the estimating comprises:
    determining the estimated voltage based on particle swarm optimization by minimizing an objective function.

5. The method of claim 4, wherein the objective function $J_1$ is $$J_1 = \Sigma_{k=1}^{n} \delta_k (I - f_k)^2 - \beta \Sigma_{k=1}^{n} U_k f_k,$$

where n is a number of sub-arrays in the photovoltaic array, $\delta_k$ (k=1, 2, ..., n) and $\beta$ are weighting factors, $U_k$ is an output voltage of the $k^{th}$ sub-array, $f_k$ is an output current of the $k^{th}$ sub-array.

6. The method of claim 4, wherein the objective function $J_2$ is $$J_2 = \Sigma_{k=1}^{n} \delta_k (I_k - f_k)^2 - \beta \Sigma_{k=1}^{n} U \cdot f_k,$$

where n is a number of sub-arrays, $\delta_k$ (k=1, 2, ..., n) and $\beta$ are weighting factors, $I_k$ is an output current of the $k^{th}$ sub-array, U is an output voltage of the sub-arrays, $f_k$ is an output current of the $k^{th}$ sub-array.

7. The method of claim 4, wherein the objective function $J_3$ is $$J_3 = \Sigma_{h=1}^{m} [\Sigma_{k=1}^{n_h} (\delta_{h,k}(I_h - f_{h,k})^2 - \beta_h U_{h,k} f_{h,k}) + \gamma_h (\Sigma_{k=1}^{n_h} U_{h,k} - U_o)^2],$$

where m is a number of bigger sub-arrays, $n_h$ is a number of smaller sub-arrays, $\delta_{h,k}$ (k=1, 2, ..., $n_h$), $h^{th}$ (h=1, 2, ..., m), $\beta_h$ and $\gamma_h$ are weighting factors, $I_h$ is an output current of the $h^{th}$ bigger sub-array, $U_o$ is an output voltage of the bigger sub-arrays, $U_{h,k}$ is an output voltage of the $k^{th}$ smaller sub-array in the $h^{th}$ bigger sub-array, $f_{h,k}$ is an output current of the $k^{th}$ smaller sub-array in the $h^{th}$ bigger sub-array.

8. The method of claim 4, wherein the objective function $J_4$ is $$J_4 = \Sigma_{h=1}^{m} [\Sigma_{k=1}^{n_h} (\delta_{h,k}(I_{h,k} - f_{h,k})^2 - \beta_h U_h f_{h,k}) + \gamma_h (\Sigma_{k=1}^{n_h} I_{h,k} - I_o)^2],$$

where m is a number of bigger sub-arrays, $n_h$ is a number of smaller sub-arrays, $\delta_{h,k}$ (k=1, 2, ..., $n_h$), $\beta_h$ and $\gamma_h$ are weighting factors, $U_h$ is an output voltage of the $h^{th}$ bigger sub-array, $I_o$ denotes an output current of the bigger sub-arrays, $I_{h,k}$ is an output current of the $k^{th}$ smaller sub-array in the $h^{th}$ bigger sub-array, $f_{h,k}$ is an output current of the $k^{th}$ smaller sub-array in the $h^{th}$ bigger sub-array.

9. A photovoltaic power conversion system, comprising:
a photovoltaic array generating a power with multiple local maximum power points;
a power converter for converting a voltage supplied by the photovoltaic array into a converted voltage;
a maximum power point (MPP) voltage estimator for producing an estimated voltage corresponding to a global MPP of the power generated by the photovoltaic array;
a controller for tracking an output of the power based on the estimated voltage to determine the global MPP and for generating a control signal to control an operation of the power converter in accordance with the global MPP, wherein the power converter includes a switch and the control signal includes a desired duty cycle of the switch; and
a processor for:
determining an estimated duty cycle of the switch according to $$d = 1 - \frac{V}{V_{dc}},$$

wherein d is the estimated duty cycle, V is the estimated voltage, $V_{dc}$ is an output voltage of a load;
modifying the estimated duty cycle according to the global MPP using a measured current and a measured voltage of the photovoltaic array to produce a modified duty cycle; and
adjusting the modified duty cycle with a duty cycle error to produce the desired duty cycle, wherein the duty cycle error represents the difference between the measured voltage and a desired voltage of the photovoltaic array calculated based on the desired duty cycle and the voltage of the load.

10. The system of claim 9, wherein the tracking is based on measured voltage and current signals of the photovoltaic array and a measured voltage signal of a load powered by the photovoltaic array.

* * * * *